United States Patent
Yu et al.

(10) Patent No.: US 12,357,970 B2
(45) Date of Patent: Jul. 15, 2025

(54) POROUS MANGANESE-CONTAINING FENTON CATALYTIC MATERIAL AND PREPARATION METHOD AND USE THEREOF

(71) Applicant: Fuzhou University, Fujian (CN)

(72) Inventors: Yan Yu, Fujian (CN); Zanyong Zhuang, Fujian (CN); Linxin Zhou, Fujian (CN)

(73) Assignee: Fuzhou University, Fujian (CN)

( * ) Notice: Subject to any disclaimer, the term of this patent is extended or adjusted under 35 U.S.C. 154(b) by 464 days.

(21) Appl. No.: 17/846,268

(22) Filed: Jun. 22, 2022

(65) Prior Publication Data

US 2023/0338926 A1     Oct. 26, 2023

(30) Foreign Application Priority Data

Apr. 21, 2022   (CN) .......................... 202210421847.1

(51) Int. Cl.
| | |
|---|---|
| *B01J 23/34* | (2006.01) |
| *B01J 23/02* | (2006.01) |
| *B01J 35/30* | (2024.01) |
| *B01J 35/50* | (2024.01) |
| *B01J 37/02* | (2006.01) |
| *B01J 37/04* | (2006.01) |
| *B01J 37/08* | (2006.01) |
| *C02F 1/72* | (2023.01) |
| *C02F 101/20* | (2006.01) |

(52) U.S. Cl.
CPC .............. *B01J 23/34* (2013.01); *B01J 23/02* (2013.01); *B01J 35/393* (2024.01); *B01J 35/50* (2024.01); *B01J 37/0217* (2013.01); *B01J 37/0221* (2013.01); *B01J 37/04* (2013.01); *B01J 37/086* (2013.01); *C02F 1/725* (2013.01); *C02F 2101/20* (2013.01); *C02F 2101/40* (2013.01)

(58) Field of Classification Search
None
See application file for complete search history.

(56) References Cited

U.S. PATENT DOCUMENTS

2015/0273407 A1* 10/2015 Gil ........................... C02F 1/44
                                                                530/370

OTHER PUBLICATIONS

Yufeng Wu et al., Recycling biowaste shells to produce 0D/2D Mn—Ca Recycling biowaste shells to produce 0D/2D MnâCa nanostructures for efficient trace-level metal extraction: confined growth of nanosheets and good dispersion of quantum dots, Journal of Material Chemistry A, 5, 20448-201457 (Year: 2017).*

* cited by examiner

*Primary Examiner* — Peter Keyworth
(74) *Attorney, Agent, or Firm* — Laurence A. Greenberg; Werner H. Stemer; Ralph E. Locher

(57) ABSTRACT

The disclosure provides a porous manganese-containing Fenton catalytic material and a preparation method and use thereof. The porous manganese-containing Fenton catalytic material according to the disclosure includes particles with a cluster structure and the particles with the cluster structure include a porous-structure calcium oxide and two-dimensional nanosheets of a Mn—Ca compound on a surface of the porous-structure calcium oxide.

9 Claims, 27 Drawing Sheets

POROUS MANGANESE-CONTAINING FENTON CATALYTIC MATERIAL AND PREPARATION METHOD AND USE THEREOF

CROSS REFERENCE TO RELATED APPLICATION

This application claims the benefit and priority of Chinese Patent Application No. 202210421847.1, entitled "Porous manganese-containing Fenton catalytic material and preparation method and use thereof" filed on Apr. 21, 2022, the present disclosure of which is incorporated by reference herein in its entirety as part of the present application.

TECHNICAL FIELD

The present disclosure relates to the technical field of materials and environmental science and engineering, in particular to a porous manganese-containing Fenton catalytic material and a preparation method and use thereof.

BACKGROUND ART

Pollutants in water bodies have complex composition, and most of the polluted water bodies are mixed wastewater containing persistent organic pollutants and various heavy metal ions. Conventional water pollution treatment methods mainly include physical methods, chemical methods, and biological methods. Among them, the treatment effects of physical methods and biological methods are limited because it is difficult to degrade organic matters by these methods. Chemical methods mainly include photocatalytic methods and Fenton-catalytic methods. Among them, the Fenton-catalytic method belongs to the advanced oxidation method of free radicals, with an oxidation potential as high as 2.73 eV, which is the most effective method in practical technologies for treating organic polluted wastewater.

There are two key bottlenecks in the practical application of traditional Fenton catalysts: (1) excess $H_2O_2$ needs to be added as a reaction source and an oxidation aid; (2) a strongly acidic environment with pH 2-3 is required for $Fe^{2+}$ to catalyze decomposition of $H_2O_2$ to generate hydroxyl radicals. However, adding a large amount of $H_2O_2$ not only increases the cost of reagents, but also results in greatly increased equipment cost because $H_2O_2$ itself is highly corrosive, and even could corrode the cement pool. In addition, when the pH value of the reaction system is in the range of 2-3, $Fe^{3+}$ could not be smoothly reduced to $Fe^{2+}$, and thus the catalytic reaction is hindered, resulting in poor durable effect. Moreover, such a low working pH range means that a large amount of acid must be added to adjust the wastewater to be acidic during the practical wastewater treatment, and that after the Fenton-catalytic reaction it is necessary to add a basic solution to adjust the pH value, resulting in complicated treatment process of polluted water bodies, a large amount of acid-base reagents, high treatment cost, corrosion of equipment, and the production of a large amount of iron hydroxide sludge. The production of iron hydroxide sludge would lead to the deactivation of the Fenton catalyst, and also greatly increase the cost and difficulty of the wastewater treatment. Therefore, how to solve the above two bottlenecks faced by Fenton-catalytic reaction and how to design and develop new Fenton catalysts with wide pH response and without the addition of $H_2O_2$ have become the hotspot and focus of international and domestic research.

Many scholars at home and abroad have carried out a lot of researches on this. The main research ideas include regulating catalyst components, designing new type Fenton catalysts, and introducing auxiliary means such as ultraviolet light, electricity, microwave, and ultrasound to enhance the generation of hydroxyl radicals and increase degradation rates of pollutants. Some progress has been made in these researches, and the degradation efficiency of organic pollutants has been improved to a certain extent. However, because the activation energy needed in the decomposition of $H_2O_2$ into hydroxyl radicals is more than 220 kJ/mol, the decomposition efficiency of conventional catalysts is still low, and the use of various auxiliary means increases equipment cost investment, process complexity and energy consumption. Therefore, the bottleneck problem that restricts the large-scale application of Fenton-catalytic reaction is still not well resolved.

SUMMARY

In view of this, an object of the present disclosure is to provide a porous manganese-containing Fenton catalytic material and a preparation method and use thereof. The porous manganese-containing Fenton catalytic material according to the present disclosure makes it possible to synchronously and efficiently remove organic pollutant(s) and heavy metal(s) under the condition of a broad pH range and no added $H_2O_2$.

In order to achieve the above-mentioned object of the present disclosure, the present disclosure provides the following technical solutions:

The present disclosure provides a porous manganese-containing Fenton catalytic material, comprising particles with a cluster structure, wherein the particles with the cluster structure comprise a porous-structure calcium oxide and two-dimensional nanosheets of a Mn—Ca compound on a surface of the porous-structure calcium oxide.

In some embodiments, the particles with the cluster structure have a particle size of 5-10 μm.

In some embodiments, the two-dimensional nanosheets have a thickness of 3-4 nm.

In some embodiments, an atomic percentage of Mn in the Mn—Ca compound is in the range of 1-10%.

The present disclosure provides a method for preparing the porous manganese-containing Fenton catalytic material as described in technical solutions above, comprising steps of calcining a marine biomass shell material, to obtain a porous-structure calcium oxide;

in a protective atmosphere, mixing the porous-structure calcium oxide with an anhydrous alcohol solvent, to obtain a calcium oxide dispersion; and in a protective atmosphere, mixing the calcium oxide dispersion with a solution of a divalent manganese source to obtain a mixture, and subjecting the mixture to a self-assembly reaction, to obtain the porous manganese-containing Fenton catalytic material.

In some embodiments, the marine biomass shell material comprises at least one selected from the group consisting of an oyster shell, a paphia undulata shell, and a scallop shell.

In some embodiments, calcining the marine biomass shell material is performed at a temperature of 900-1200° C. for 1-5 h.

In some embodiments, a mass ratio of the porous-structure calcium oxide to the divalent manganese source is in the range of 1:0.3 to 1:30.

In some embodiments, the self-assembly reaction is performed with a stirring, and the stirring is performed at a speed of 500-1,000 rpm for 3-48 h.

The present disclosure provides use of the porous manganese-containing Fenton catalytic material as described in technical solutions above or prepared by the method as described in technical solutions above in removing at least one of an organic pollutant and a heavy metal.

The present disclosure provides a porous manganese-containing Fenton catalytic material, comprising particles with a cluster structure, wherein the particles with the cluster structure comprise a porous-structure calcium oxide and two-dimensional nanosheets of a Mn—Ca compound on a surface of the porous-structure calcium oxide. The traditional Fenton catalytic reaction is performed between $H_2O_2$ and $Fe^{2+}$ under an acidic condition. The porous manganese-containing Fenton catalytic material according to the present disclosure has a porous structure, enabling $O_2$ in the air to be adsorbed and transferred efficiently; with the catalysis of Mn therein, $O_2$ is converted in situ to $H_2O_2$, and then the $H_2O_2$ is decomposed efficiently into hydroxyl radicals, thereby realizing the degradation of organic pollutant(s) without adding $H_2O_2$. Further, the porous manganese-containing Fenton catalytic material according to the present disclosure enables that organic pollutant(s) could be degraded under the condition of a broad pH range (pH=2-9), broadening the pH range suitable for using Fenton catalytic material, and breaking two bottlenecks of the current Fenton catalytic reaction. Also, the porous-structure calcium oxide has a certain adsorption capacity, and the doping of manganese further enhances the adsorption of heavy metals by calcium oxide, thereby realizing synchronous and efficient adsorption and removal of heavy metals. The porous manganese-containing Fenton catalytic material according to the present disclosure has the dual functions of degrading organic pollutants and adsorbing heavy metals, which makes it possible to synchronously and efficiently remove organic and inorganic multiple pollutants in wastewater, thereby filling the blank of the existing Fenton catalytic material in terms of synchronously degrading organic pollutants and adsorbing heavy metals for purification.

The present disclosure provides a method for preparing the porous manganese-containing Fenton catalytic material as described in the above technical solutions. The method according to the present disclosure has the advantages of simple flow process, easy operations, low cost, great applicability, and environmental-friendliness, and could be used for large-scale industrial production, and has good economic and environmental benefits.

Further, in the method according to the present disclosure, the proportion of Mn and the type of solvent could be changed to obtain different porous manganese-containing Fenton catalytic material products, which exhibits high degradation activity for organic matters and adsorption activity for heavy metals, and is an environmently-friendly new product. The catalytic material therefore has good application value and application prospect in the removal of organic pollutants and/or heavy metals.

DETAILED DESCRIPTION OF THE EMBODIMENTS

Figure 1:
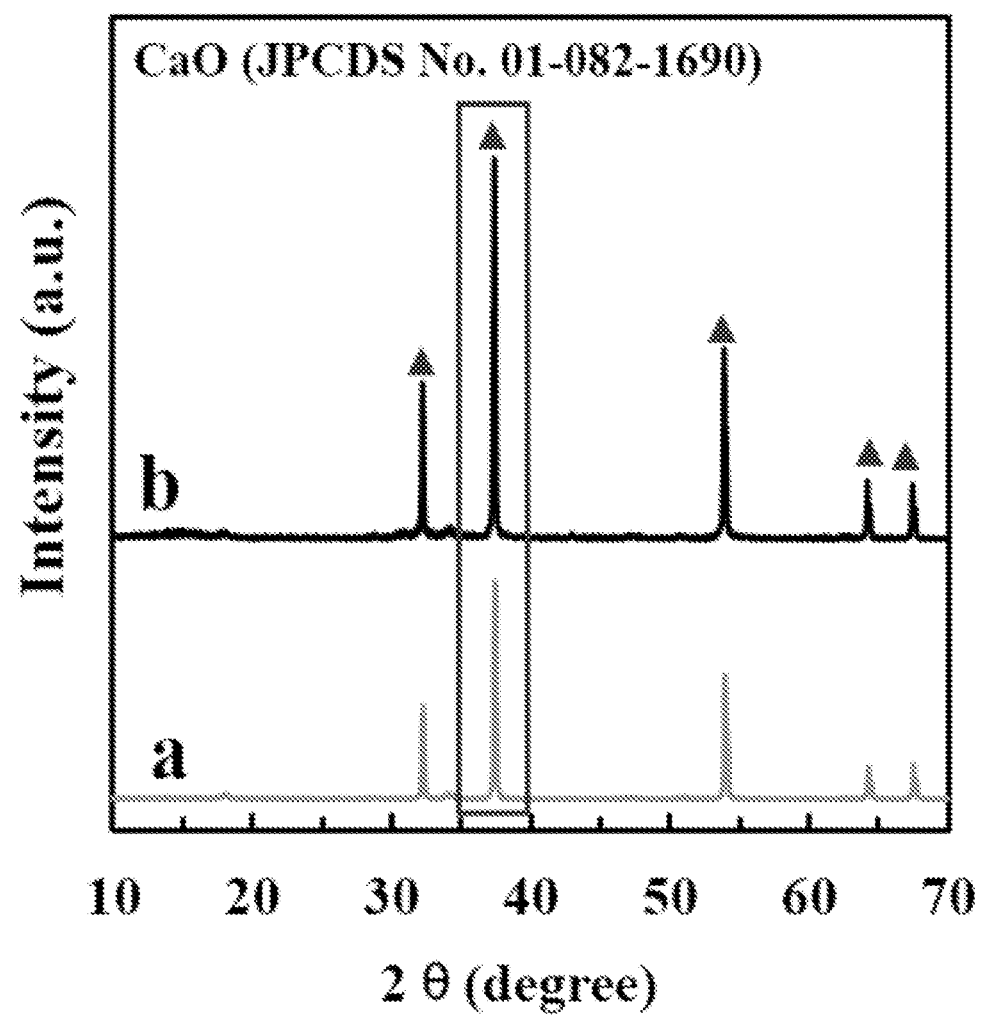
FIG. 1 shows an X-ray diffraction (XRD) pattern of the porous manganese-containing Fenton catalytic material as prepared in Example 1.

The present disclosure provides a porous manganese-containing Fenton catalytic material, comprising particles with a cluster structure, wherein
the particles with the cluster structure comprise a porous-structure calcium oxide and two-dimensional nanosheets of a Mn—Ca compound on the surface of the porous-structure calcium oxide. In some embodiments of the present disclosure, the particles with the cluster structure have a particle size of 5-10 μm, preferably 6-9 μm, and more preferably 7-8 μm. In some embodiments of the present disclosure, the two-dimensional nanosheets have a thickness of 3-4 nm, and preferably 3.4-3.8 nm. In some embodiments of the present disclosure, an atomic percentage of Mn in the Mn—Ca compound is in the range of 1-10%, preferably 1.2-7.5%, more preferably 2-7%, and further more preferably 3-5%.

The present disclosure provides a method for preparing the porous manganese-containing Fenton catalytic material as described in the above technical solutions, comprising steps of
calcining a marine biomass shell material, to obtain a porous-structure calcium oxide;
in a protective atmosphere, mixing the porous-structure calcium oxide with an anhydrous alcohol solvent, to obtain a calcium oxide dispersion; and
in a protective atmosphere, mixing the calcium oxide dispersion with a solution of a divalent manganese source to obtain a mixture, and subjecting the mixture to a self-assembly reaction, to obtain the porous manganese-containing Fenton catalytic material.

In the present disclosure, unless otherwise specified, all raw material components are commercially available commodities well known to those skilled in the art.

In the present disclosure, the marine biomass shell material is calcined to obtain a porous-structure calcium oxide.

In some embodiments of the present disclosure, the marine biomass shell material comprises at least one selected from the group consisting of an oyster shell, a paphia undulata shell, and a scallop shell. In some embodiments of the present disclosure, the marine biomass shell material is washed with water, and then subjected to a drying, a crushing and a sieving in sequence, and the portion passing through the sieve (marine biomass shell powder) is then calcined. In some embodiments of the present disclosure, the drying is performed at a temperature of 50-100° C., preferably 60-90° C., and more preferably 70-80° C. In the present disclosure, there is no special limitation on the time for drying, as long as a constant weight is reached by drying. In some embodiments, the time for drying is specifically 2-8 h, and preferably 4-6 h. In the present disclosure, there is no particular limitation to the crushing, and a crushing means well known to those skilled in the art may be used, such as grinding. In some embodiments, the marine biomass shell powder obtained by grinding has a particle size of not more than 80 mesh. In some embodiments of the present disclosure, a sieve for sieving has a pore size of 80 mesh.

In some embodiments of the present disclosure, calcining the marine biomass shell material is performed at a temperature of 900-1200° C., preferably 950-1150° C., and more preferably 1,000-1100° C. In some embodiments, a rising rate from room temperature to the temperature for calcining is in the range of 5-20° C./min, and preferably 10-15° C./min. In some embodiments, calcining the marine biomass shell material is performed for 1-5 h, preferably 2-4 h, and more preferably 3 h. In some embodiments, the calcining is performed in an atmosphere of air.

In some embodiments, the method according to the present disclosure further comprises sequentially subjecting the obtained calcined product to a cooling to room temperature, a crushing, and a sieving to obtain a porous-structure calcium oxide. In the present disclosure, there is no particular limitation on the crushing, and means for crushing well known to those skilled in the art may be used, such as grinding. In some embodiments, the marine biomass shell powder obtained by grinding has a particle size of not more than 80 mesh. In some embodiments of the present disclosure, a sieve for sieving has a pore size of 80 mesh.

According to the present disclosure, after obtaining the porous-structure calcium oxide, the porous-structure calcium oxide is mixed with an anhydrous alcohol solvent in a protective atmosphere to obtain a calcium oxide dispersion.

In the present disclosure, there is no particular limitation on the protective atmosphere, and a protective atmosphere well-known to those skilled in the art may be used, such as nitrogen or an inert gas. In some embodiments, the inert gas includes argon gas or helium gas. In the present disclosure, the mixing is carried out in a protective atmosphere, and thus a reaction between water and carbon dioxide in the air and calcium oxide could be avoided.

In some embodiments of the present disclosure, the anhydrous alcohol solvent includes anhydrous ethanol. In some embodiments of the present disclosure, the calcium oxide dispersion has a concentration of 5-50 g/L, preferably 8-30 g/L, and more preferably 10-50 g/L. In some embodiments of the present disclosure, the mixing is carried out with a stirring. In some embodiments, the stirring is performed at a speed of 500-1,000 rpm, preferably 600-900 rpm, and more preferably 700-800 rpm. In some embodiments, the mixing is performed for 20-60 min, preferably 30-50 min, and more preferably 30-40 min. In some embodiments, the mixing is performed at a temperature of 20-50° C., and preferably 20-30° C. In specific embodiments of the present disclosure, the mixing is performed at room temperature.

According to the present disclosure, after obtaining the calcium oxide dispersion, in a protective atmosphere, the calcium oxide dispersion is mixed with a solution of a divalent manganese source to obtain a mixture, and the mixture is then subjected to a self-assembly reaction, to obtain the porous manganese-containing Fenton catalytic material.

In some embodiments of the present disclosure, the solution of the divalent manganese source is obtained by dissolving a divalent manganese source in an anhydrous alcohol solvent. In some embodiments of the present disclosure, the anhydrous alcohol solvent includes anhydrous ethanol. In some embodiments of the present disclosure, the divalent manganese source includes manganese chloride and/or manganese sulfate. In some embodiments of the present disclosure, the solution of the divalent manganese source has a concentration of 10-100 g/L, preferably 15-80 g/L, and more preferably 20-50 g/L. In some embodiments of the present disclosure, the dissolving is performed with a stirring. In some embodiments, the stirring is performed at a speed of 500-1,000 rpm, preferably 600-900 rpm, and more preferably 700-800 rpm. In some embodiments, the stirring is performed for 20-60 min, preferably 30-50 min, and more preferably 30-40 min. In some embodiments, the dissolving is performed at a temperature of 20-50° C., and preferably 20-30° C. In specific embodiments of the present disclosure, the dissolving is performed at ambient temperature.

In some embodiments of the present disclosure, the protective atmosphere is the same as the aforementioned protective atmosphere, which will not be repeated here. In the present disclosure, the mixing and self-assembly reaction are performed in a protective atmosphere, and thus the reaction between water and carbon dioxide in the air and calcium oxide could be avoided.

In some embodiments of the present disclosure, a mass ratio of the porous-structure calcium oxide in the calcium oxide dispersion to the divalent manganese source in the solution of the manganese source solution is in the range of 1:0.3 to 1:30, preferably 1:0.5 to 1:20, more preferably 1:0.5 to 1:10, and further more preferably 1:1 to 1:5.

In some embodiments of the present disclosure, the self-assembly reaction is performed with a stirring. In some embodiments, the stirring is performed at a speed of 500-1,000 rpm, preferably 600-900 rpm, and more preferably 700-800 rpm. In some embodiments, the stirring is performed for 3-48 h, preferably 5-40 h, and more preferably 5-30 h. In some embodiments, the self-assembly reaction is performed at a temperature of 20-50° C., and preferably 20-30° C. In specific embodiments of the present disclosure, the self-assembly reaction is performed at room temperature. In some embodiments of the present disclosure, taking $MnCl_2$ as an example, in the self-assembly process, when ethanol is used as a solvent, weakly acidic $MnCl_2$ in a liquid would etch CaO. By controlling the concentration of the solution, temperature for reaction, the atmosphere for reaction, and the time for reaction, a large number of nanosheets of a Mn—Ca compound are grown on the smooth surface of CaO from $MnCl_2$. The nanosheets are then accumulated to form a flower-like microstructure. With the prolongation of time, the relative content of Ca in the structure gradually decreases, the atomic percentage of Mn increases gradually, and the flower-like structure becomes more obvious.

In some embodiments, the method according to the present disclosure further includes after the self-assembly reaction subjecting the obtained self-assembly system to a solid-liquid separation to obtain a solid product, and sequentially subjecting the solid product to a washing and a drying, to obtain a porous manganese-containing Fenton catalytic material. In the present disclosure, there is no special limitation on the solid-liquid separation, and means for the solid-liquid separation well known to those skilled in the art may be used, such as a centrifugal separation. In some embodiments, the centrifugal separation is performed at a rotational speed of 8,000-10,000 rpm, and preferably 9,000 rpm. In some embodiments, the centrifugal separation is performed for 3-5 min, and preferably 4 min. In some embodiments of the present disclosure, the washing is a washing with ethanol. In some embodiments, the washing with ethanol is performed for 2-4 times, and preferably 3 times. In some embodiments of the present disclosure, the drying is a freeze-drying. In some embodiments, the freeze-drying is performed at a temperature of −60° C. to −50° C., and preferably −55° C. to −53° C. In the present disclosure, there is no special limitation on the time for the freeze-drying, as long as a constant weight could be reached by freeze-drying. In some embodiments, the freeze-drying is performed for 6-24 h, and preferably 10-20 h.

The present disclosure provides use of the porous manganese-containing Fenton catalytic material as described in the above technical solutions or the porous manganese-containing Fenton catalytic material prepared by the method as described in the above technical solutions in removing at least one of an organic pollutant and a heavy metal. In some embodiments of the present disclosure, the organic pollutant includes acid blue. In some embodiments of the present disclosure, the heavy metal includes Cu. In some embodiments of the present disclosure, removing at least one of the organic pollutant and the heavy metal is removing at least one of an organic pollutant and a heavy metal from a polluted water body containing the organic pollutant and/or heavy metal. In some embodiments of the present disclosure, a ratio of the mass of the porous manganese-containing Fenton catalytic material to the volume of the polluted water body is in the range of 1 g:(1-10) L, and preferably 1 g:(1-5) L.

The technical solutions of the present disclosure will be clearly and completely described below with reference to examples of the present disclosure. Obviously, the described examples are only some, but not all examples of the present disclosure. Based on the examples of the present disclosure, all other examples obtained by those of ordinary skill in the art without creative labor shall fall within the scope of the present disclosure.

Example 1

The oyster shells were washed with water, dried at 80° C. for 6 h, pulverized, and sieved by using a sieve having 80-mesh pores. The part passing through the sieve was collected, heated from room temperature to 1050° C. at a rate of 5° C./min and maintained at 1050° C. for 1 h (i.e. calcinating), obtaining a calcinated product. The calcinated product was cooled to room temperature, ground, and sieved by using a sieve having 80-mesh pores. The part passing through the sieve was collected, i.e. a porous-structure calcium oxide.

(2) 1.40 g of the porous-structure calcium oxide was added into a three-necked flask, and 100 mL of anhydrous ethanol was added thereto. The resulting mixture was stirred magnetically at 500 rpm for 30 min in a nitrogen protective atmosphere, obtaining a calcium oxide dispersion.

(3) 3.15 g of manganese chloride ($MnCl_2$) and 150 mL of anhydrous ethanol were stirred at 500 rpm and mixed to be uniform, obtaining a solution of a manganese source.

(4) The solution of the manganese source was added to the calcium oxide dispersion. The resulting mixture was stirred magnetically at 500 rpm for 24 h in a nitrogen protective atmosphere (i.e. undergoing a self-assembly reaction), obtaining a self-assembly system. The self-assembly system was subjected to a centrifugal separation at a centrifugal speed of 8,000 rpm for 5 min, obtaining a solid product. The obtained solid product was washed with anhydrous ethanol for three times, obtaining a washed solid product. The washed solid product was freeze-dried under vacuum at −53° C. for 8 h, obtaining a porous manganese-containing Fenton catalytic material.

Example 2

A porous manganese-containing Fenton catalytic material was prepared according to the method as described in Example 1, except that the oyster shells were replaced with paphia undulata shells.

Example 3

A porous manganese-containing Fenton catalytic material was prepared according to the method as described in Example 1, except that the oyster shells were replaced with scallop shells.

Example 4

A porous manganese-containing Fenton catalytic material was prepared according to the method as described in Example 1, except that in step (4) the resulting mixture was stirred magnetically for 3 h.

Example 5

A porous manganese-containing Fenton catalytic material was prepared according to the method as described in Example 1, except that in step (4) the resulting mixture was stirred magnetically for 6 h.

Example 6

A porous manganese-containing Fenton catalytic material was prepared according to the method as described in Example 1, except that in step (4) the resulting mixture was stirred magnetically for 12 h.

Example 7

A porous manganese-containing Fenton catalytic material was prepared according to the method as described in Example 1, except that 4.73 g of manganese chloride in step (3) was used.

Example 8

The porous manganese-containing Fenton catalytic material was prepared according to the method as described in Example 1, except that 6.30 g of manganese chloride in step (3) was used.

Comparative Example 1

(1) The oyster shells were washed, dried at 80° C. for 6 h, pulverized, and sieved by using a sieve having 80-mesh pores. The part passing through the sieve was collected, i.e. an oyster shell powder.

(2) 1.40 g of the oyster shell powder was added into a three-necked flask, and 100 mL of anhydrous ethanol was added thereto. The resulting mixture was stirred magnetically at 500 rpm for 30 min in a nitrogen protective atmosphere, obtaining a calcium source dispersion.

(3) 3.15 g of manganese chloride ($MnCl_2$) and 150 mL of anhydrous ethanol were stirred at 500 rpm and mixed to be uniform, obtaining a solution of a manganese source.

(4) The solution of the manganese source was added to the calcium source dispersion. The resulting mixture was stirred magnetically at 500 rpm for 24 h in a nitrogen protective atmosphere (i.e. undergoing a self-assembly reaction), obtaining a self-assembly system. The self-assembly system was subjected to a centrifugal separation, obtaining a solid product. The obtained solid product was washed with ethanol for three times, obtaining a washed solid product. The washed solid product was freeze-dried at −53° C. for 8 h, obtaining a manganese-containing Fenton catalytic material.

Comparative Example 2

A porous manganese-containing Fenton catalytic material was prepared according to the method as described in Example 1, except that the magnetic stirring in steps (2) and (4) was performed in air.

Comparative Example 3

A porous manganese-containing Fenton catalytic material was prepared according to the method as described in Example 1, except that 100 mL of anhydrous ethanol and 1 mL of water were added in step (2).

Comparative Example 4

(1) The oyster shells were washed, dried at 80° C. for 6 h, obtaining a dried oyster shells. The dried oyster shells were heated from room temperature to 1050° C. at a rate of 5° C./min and maintained at 1050° C. for 1 h (i.e. calcinating), obtaining a calcinated product. The calcinated product was cooled to room temperature, ground, and sieved by using a sieve having 80-mesh pores. The part passing through the sieve was collected, i.e. obtaining a porous-structure calcium oxide.

(2) 1.40 g of the porous-structure calcium oxide was added to a three-necked flask, and 100 mL of anhydrous ethanol and 1 mL of water were added thereto. The resulting mixture was stirred magnetically at 500 rpm for 30 min in a nitrogen protective atmosphere, obtaining a calcium oxide dispersion.

(3) 3.15 g of manganese chloride ($MnCl_2$), 0.07 g of copper chloride ($CuCl_2$) and 150 mL of anhydrous ethanol were stirred at 500 rpm and mixed to be uniform, obtaining a solution of manganese and copper sources.

(4) The solution of manganese and copper sources was added to the calcium oxide dispersion. The resulting mixture was stirred magnetically at 500 rpm for 24 h in a nitrogen protective atmosphere (i.e. undergoing a self-assembly reaction), obtaining a self-assembly system. The self-assembly system was subjected to a centrifugal separation, obtaining a solid product. The obtained solid product was washed with anhydrous ethanol for 3 times, obtaining a washed solid product. The washed solid product was then freeze-dried at −53° C. for 8 h, obtaining a porous manganese- and copper-containing Fenton catalytic material.

Figure 2:
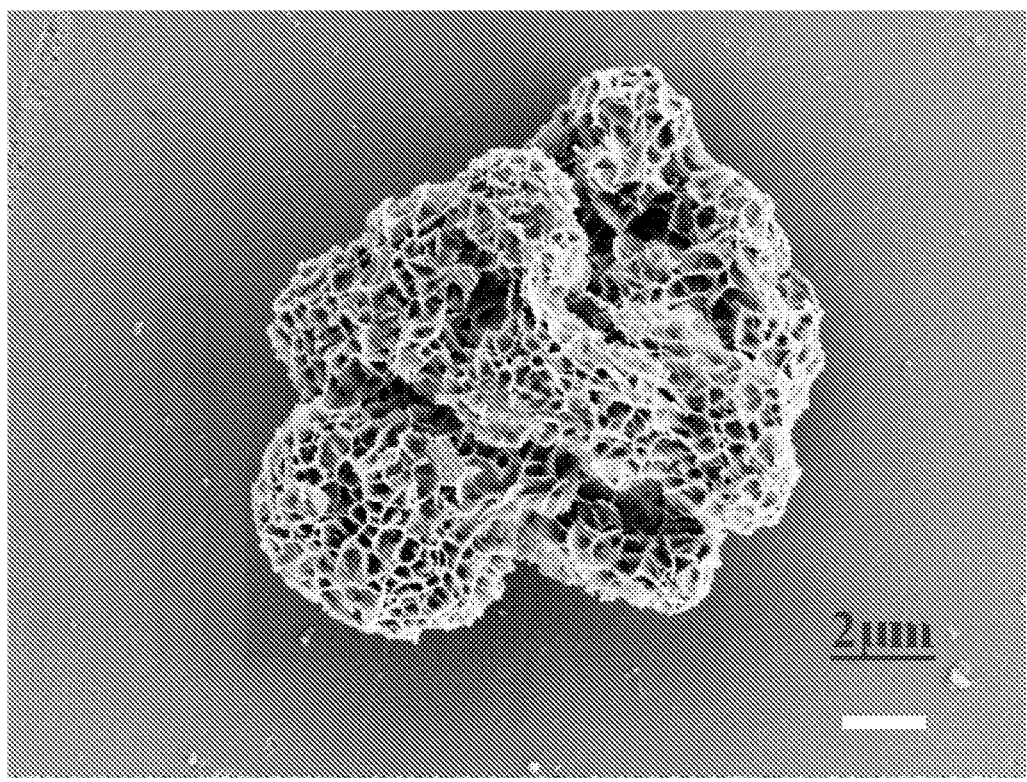
FIG. 2 is a scanning electron microscope (SEM) image of the porous manganese-containing Fenton catalytic material as prepared in Example 1.
Figure 3A:
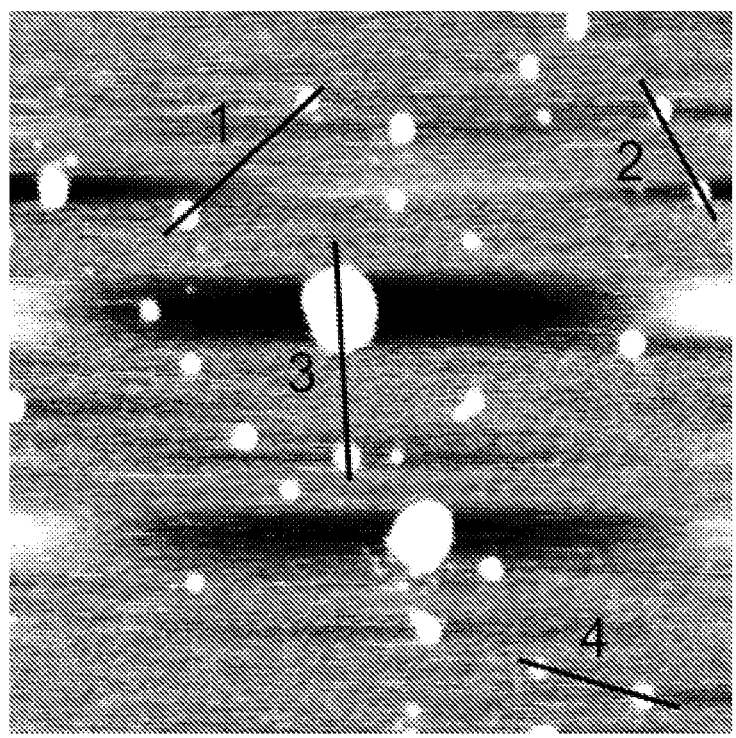
FIG. 3A is an atomic force microscope (AFM) image of the porous manganese-Fenton catalytic material as prepared in Example 1.
Figure 3B:
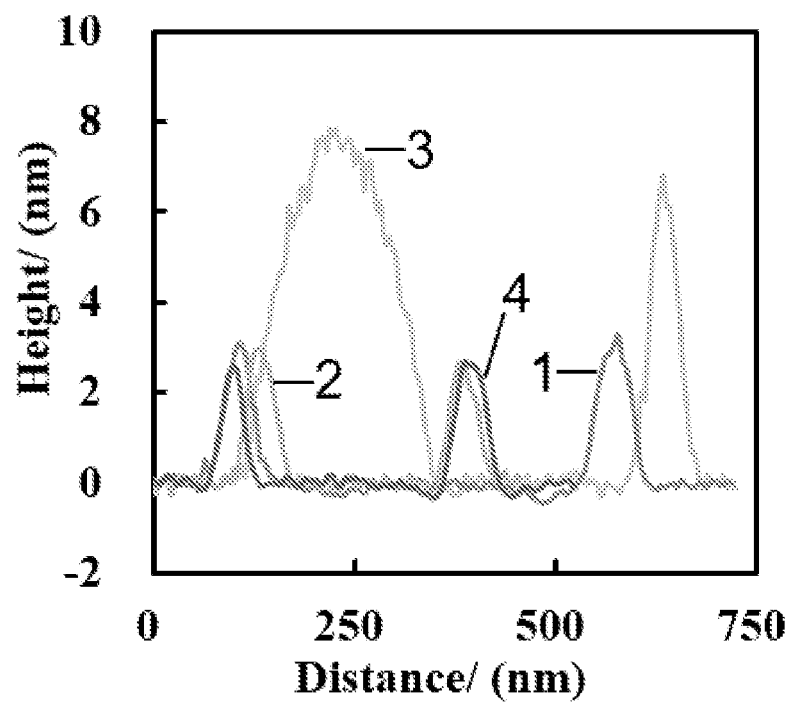
FIG. 3B is a schematic diagram of the corresponding nanosheet thickness of the porous manganese-Fenton catalytic material as prepared in Example 1.
Figure 4:
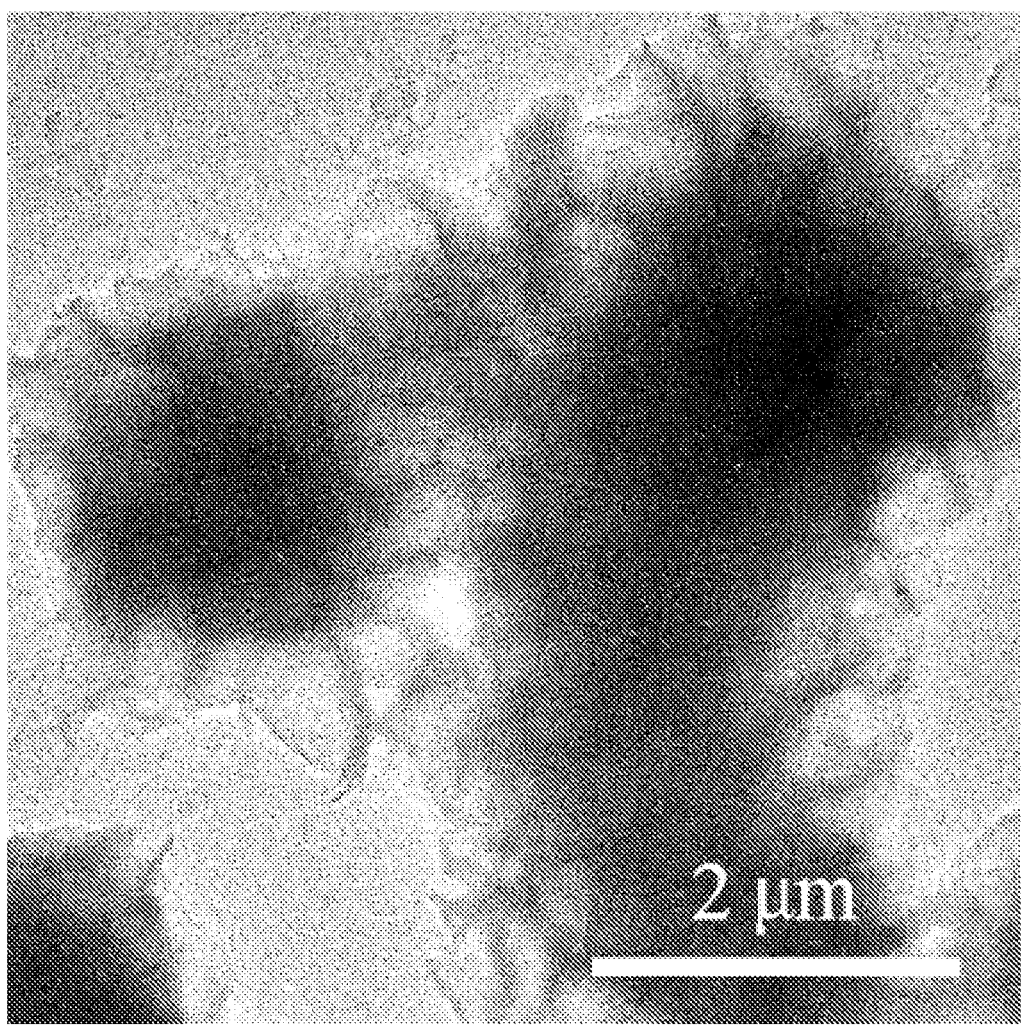
FIG. 4 is a transmission electron microscope (TEM) image of the porous manganese-containing Fenton catalytic material as prepared in Example 1.
Figure 5:
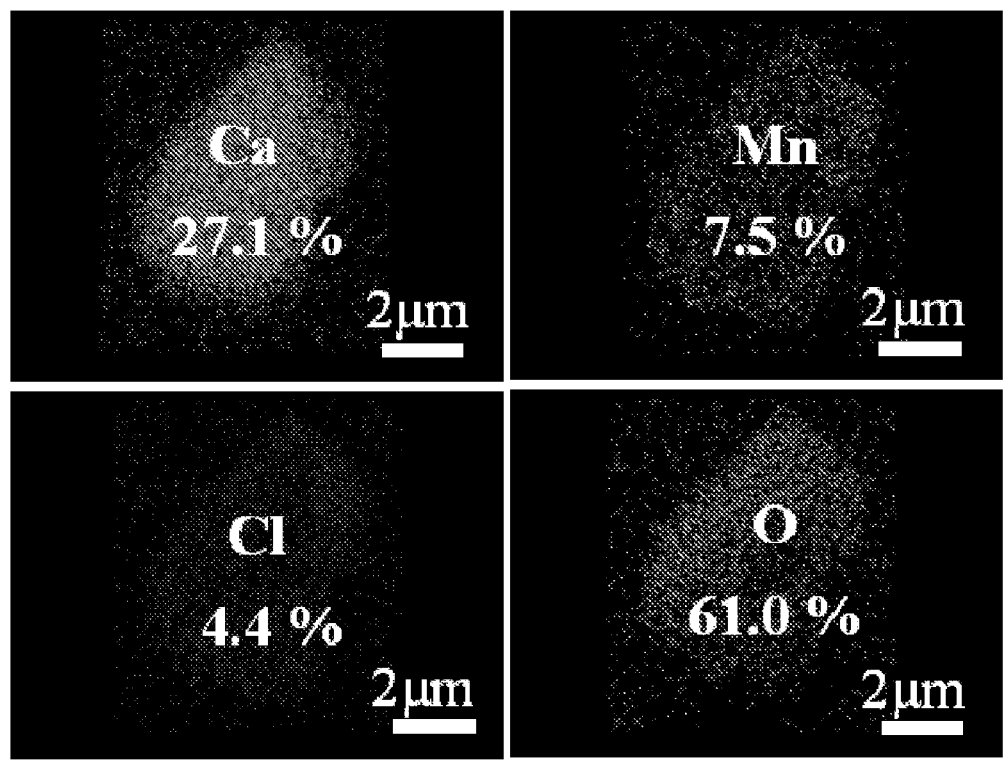
FIG. 5 shows an energy dispersive X-Ray spectroscopy (EDX) graph of the porous manganese-containing Fenton catalytic material as prepared in Example 1.
Figure 6:
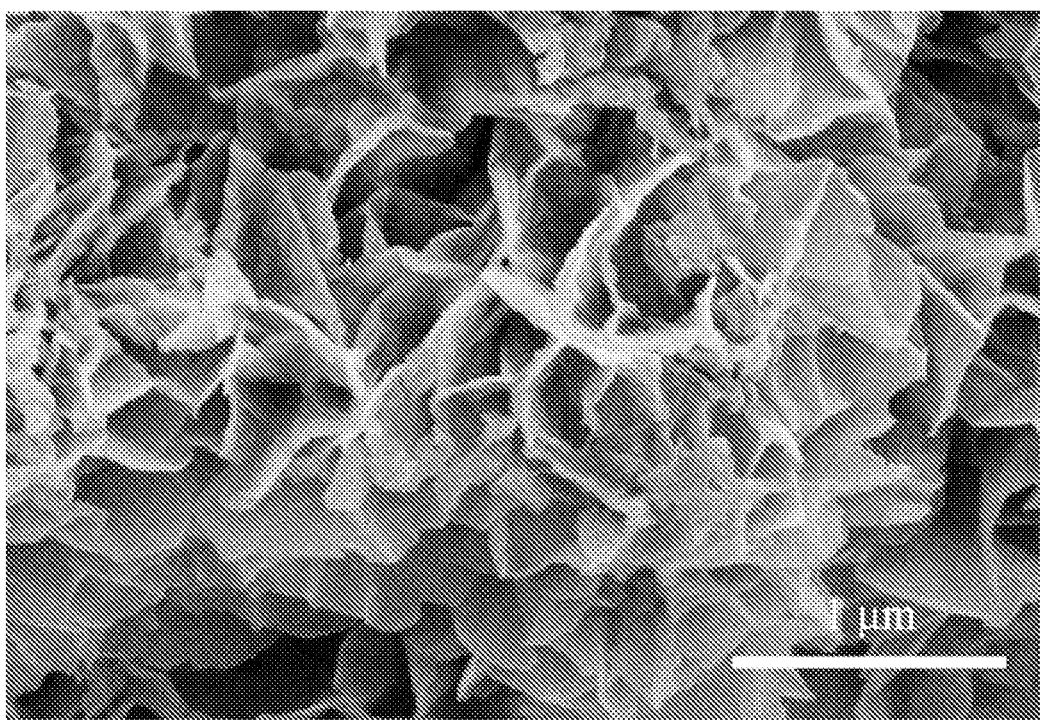
FIG. 6 is a SEM image of the porous manganese-containing Fenton catalytic material as prepared in Example 2.
Figure 7:
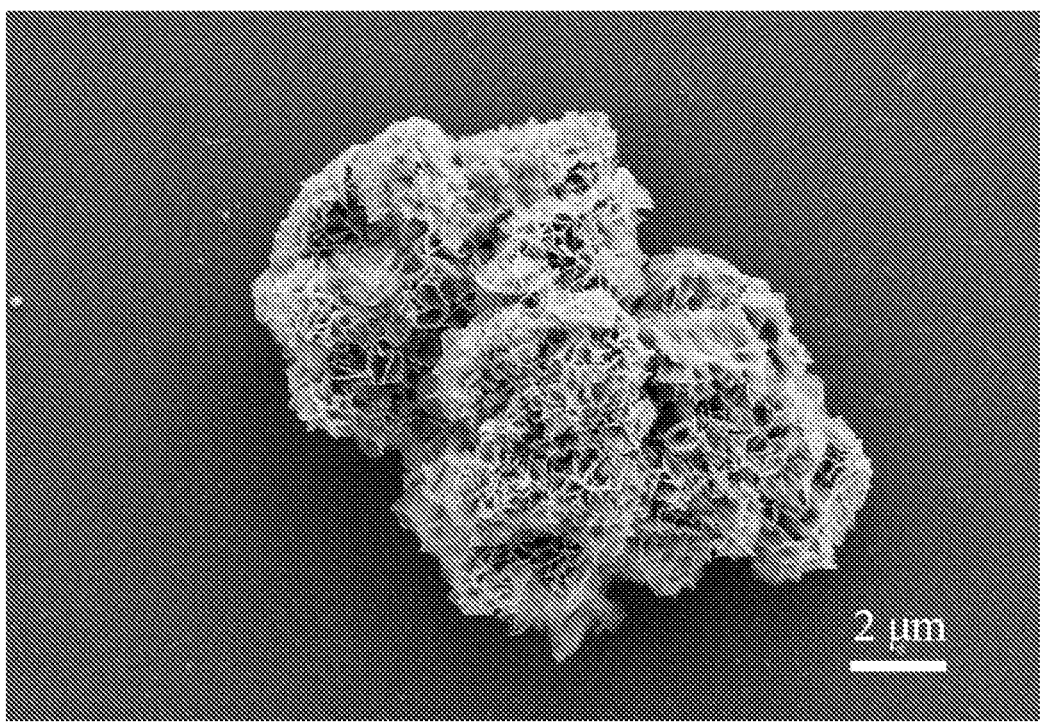
FIG. 7 is a SEM image of the porous manganese-containing Fenton catalytic material as prepared in Example 3.
Figure 8:
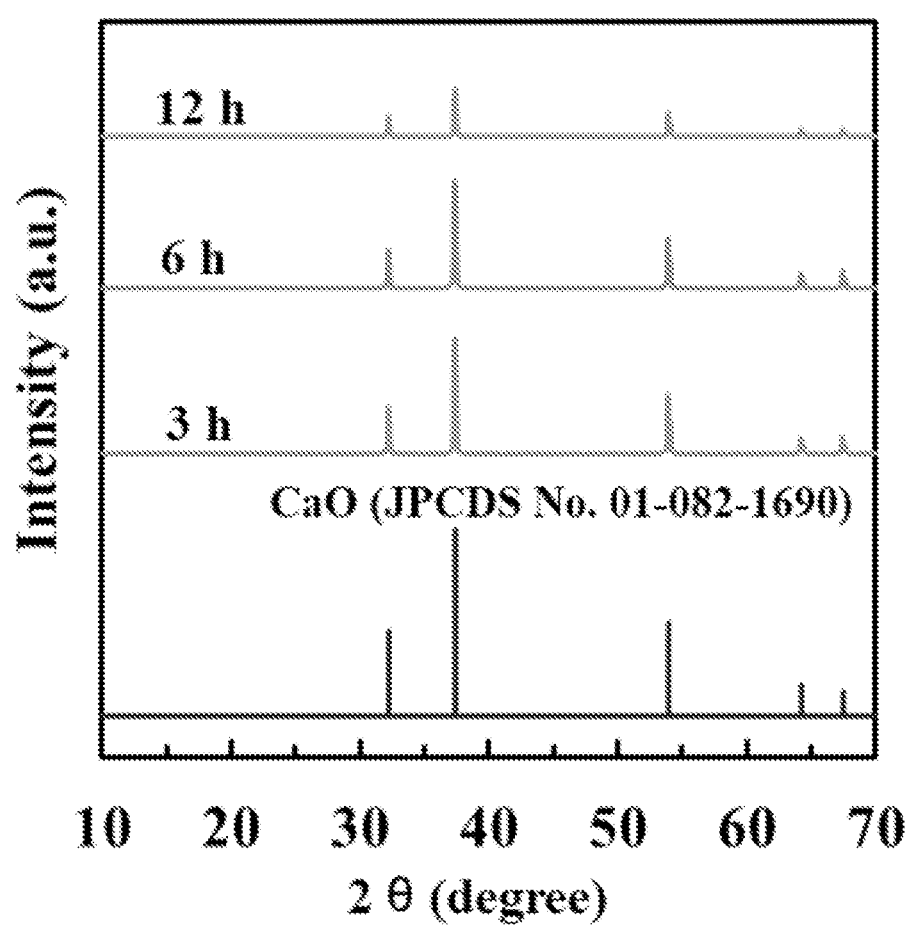
FIG. 8 is a diagram showing XRD patterns of the porous manganese-containing Fenton catalytic materials as prepared by Examples 4-6.
Figure 9:
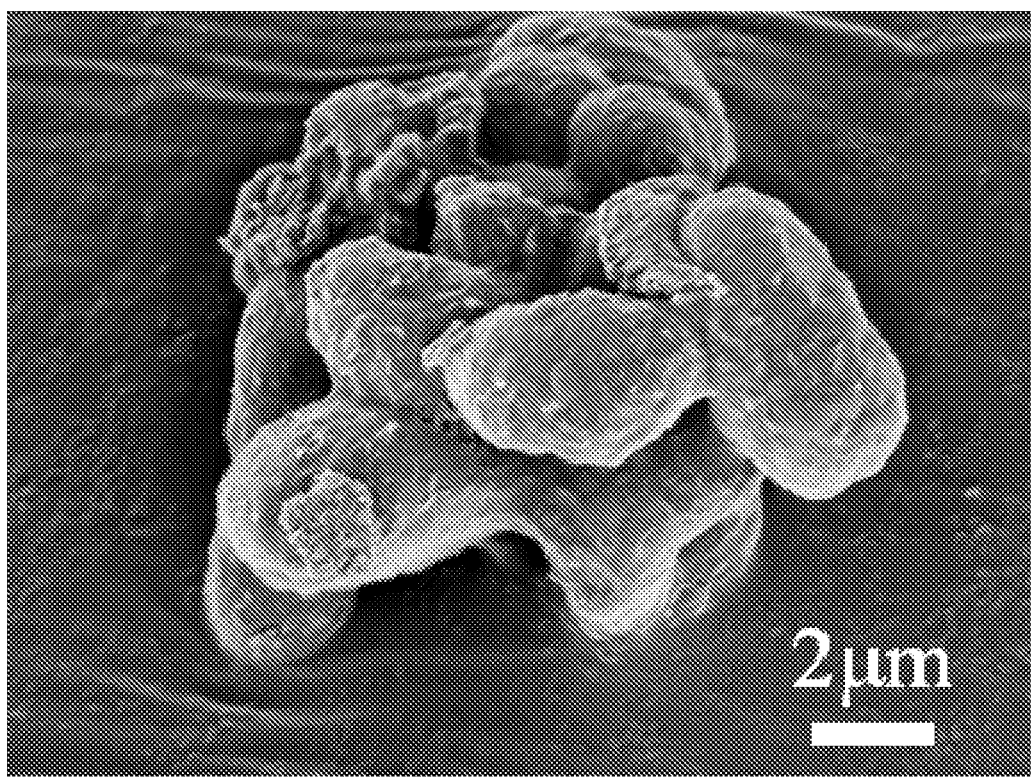
FIG. 9 is a SEM image of the porous manganese-containing Fenton catalytic material as prepared in Example 4.
Figure 10:
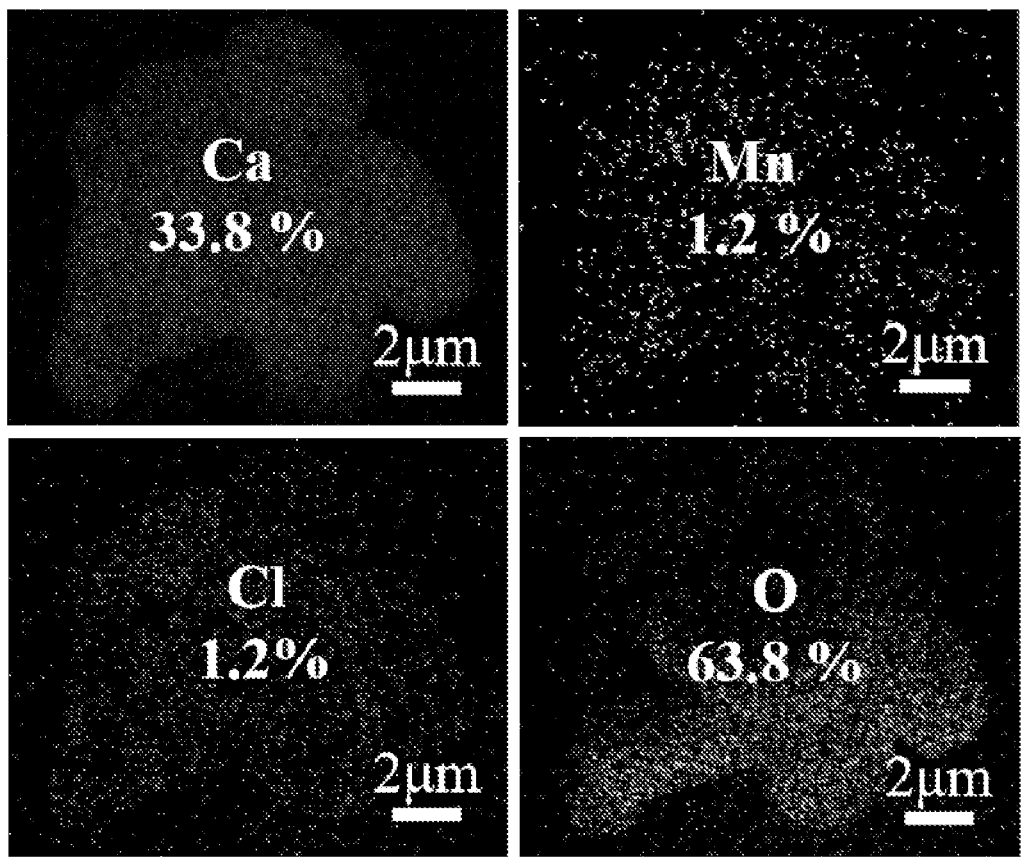
FIG. 10 shows an EDX graph of the porous manganese-containing Fenton catalytic material as prepared in Example 4.
Figure 11:
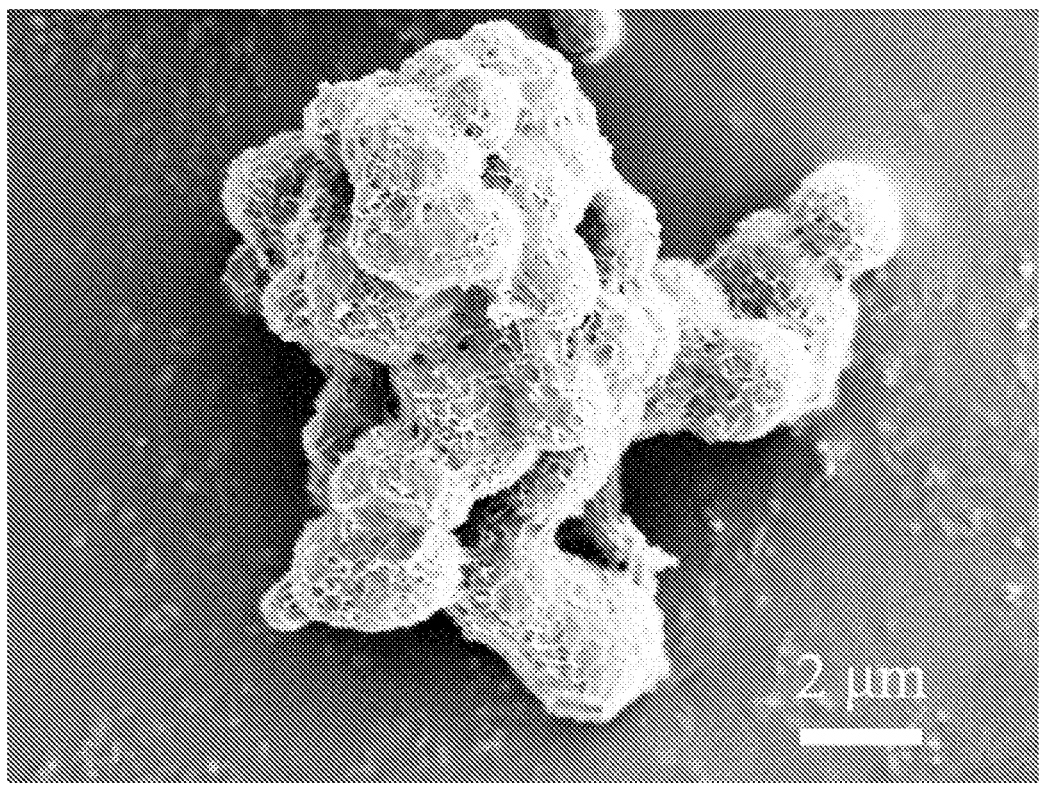
FIG. 11 is a SEM image of the porous manganese-containing Fenton catalytic material as prepared in Example 5.
Figure 12:
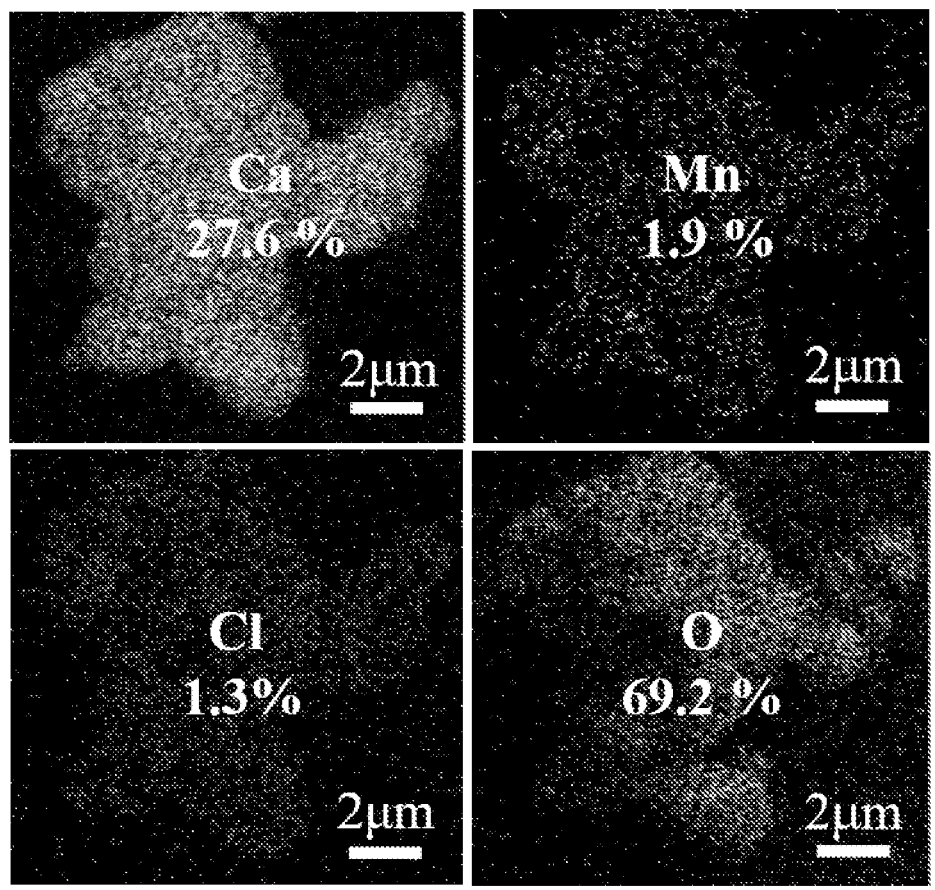
FIG. 12 shows an EDX graph of the porous manganese-containing Fenton catalytic material as prepared in Example 5.
Figure 13:
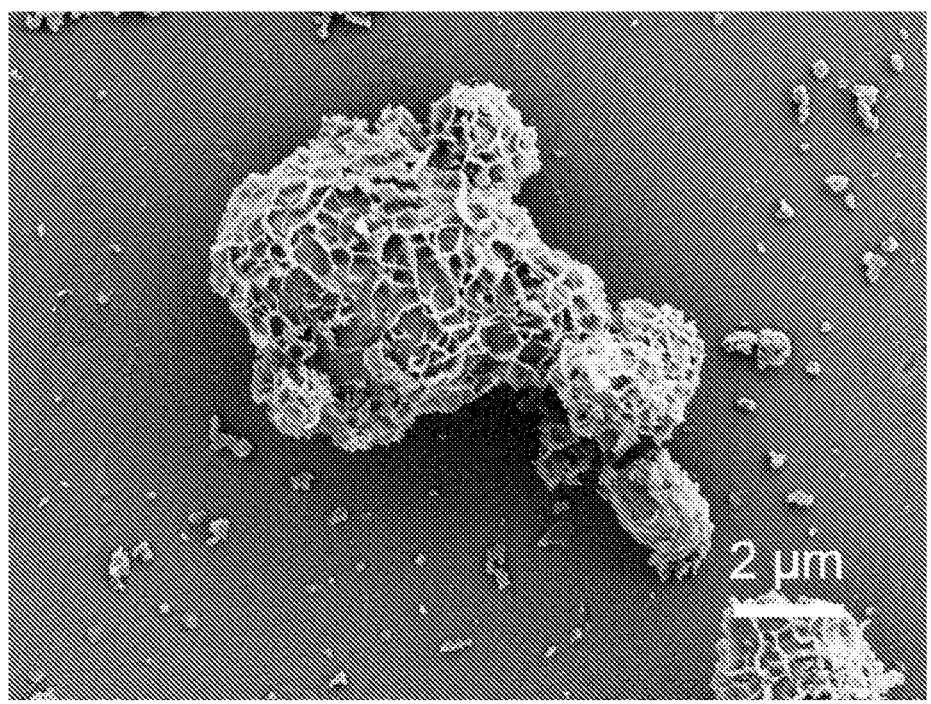
FIG. 13 is a SEM image of the porous manganese-containing Fenton catalytic material as prepared in Example 6.
Figure 14:
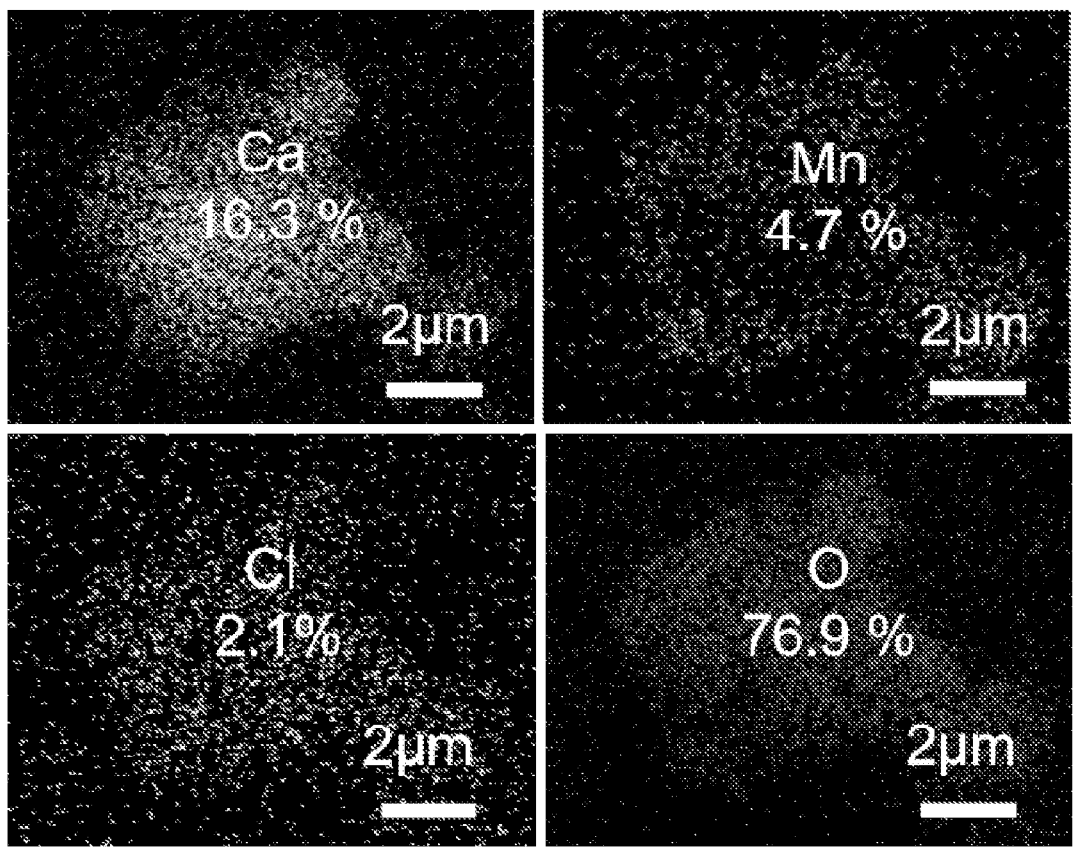
FIG. 14 shows an EDX graph of the porous manganese-containing Fenton catalytic material as prepared in Example 6.
Figure 15:
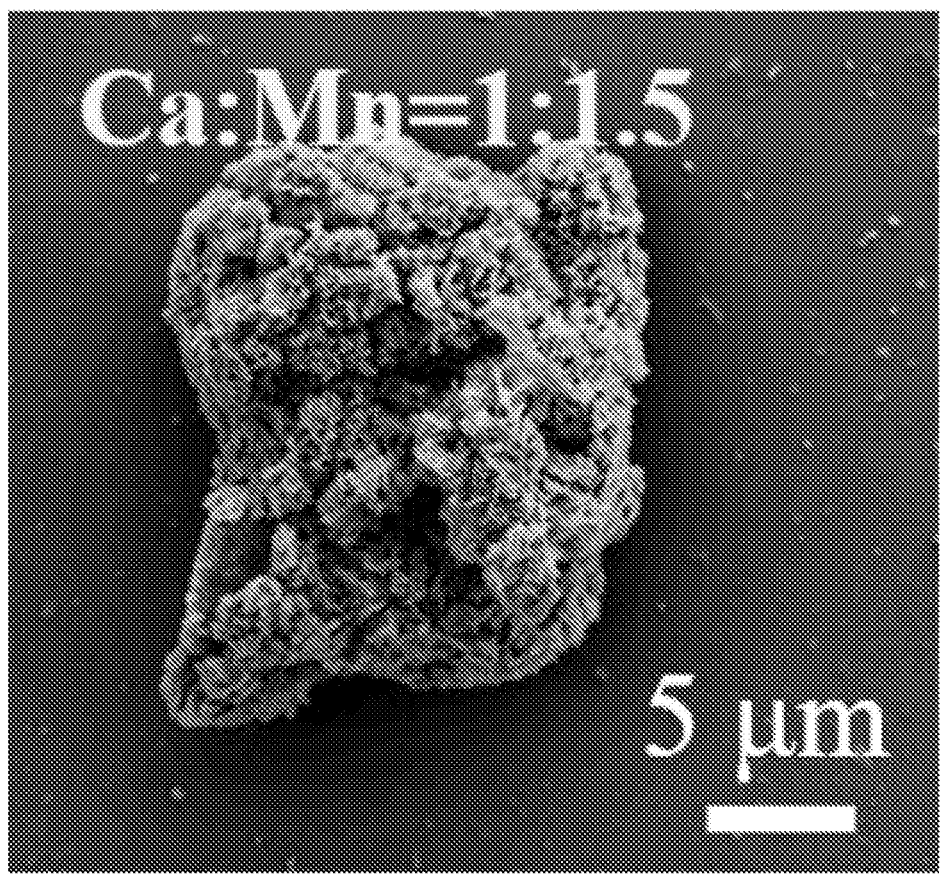
FIG. 15 is a SEM image of the porous manganese-containing Fenton catalytic material as prepared in Example 7.
Figure 16:
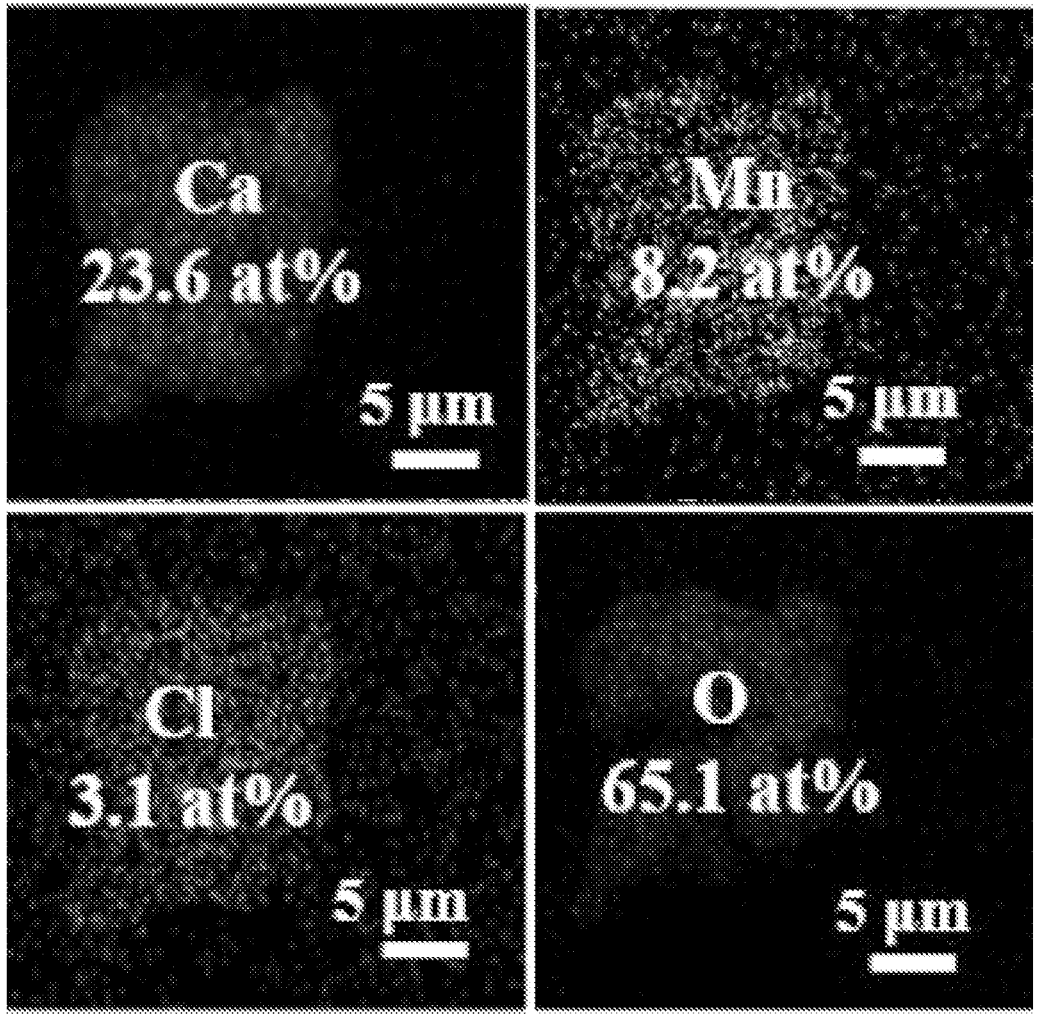
FIG. 16 shows an EDX graph of the porous manganese-containing Fenton catalytic material as prepared in Example 7.
Figure 17:
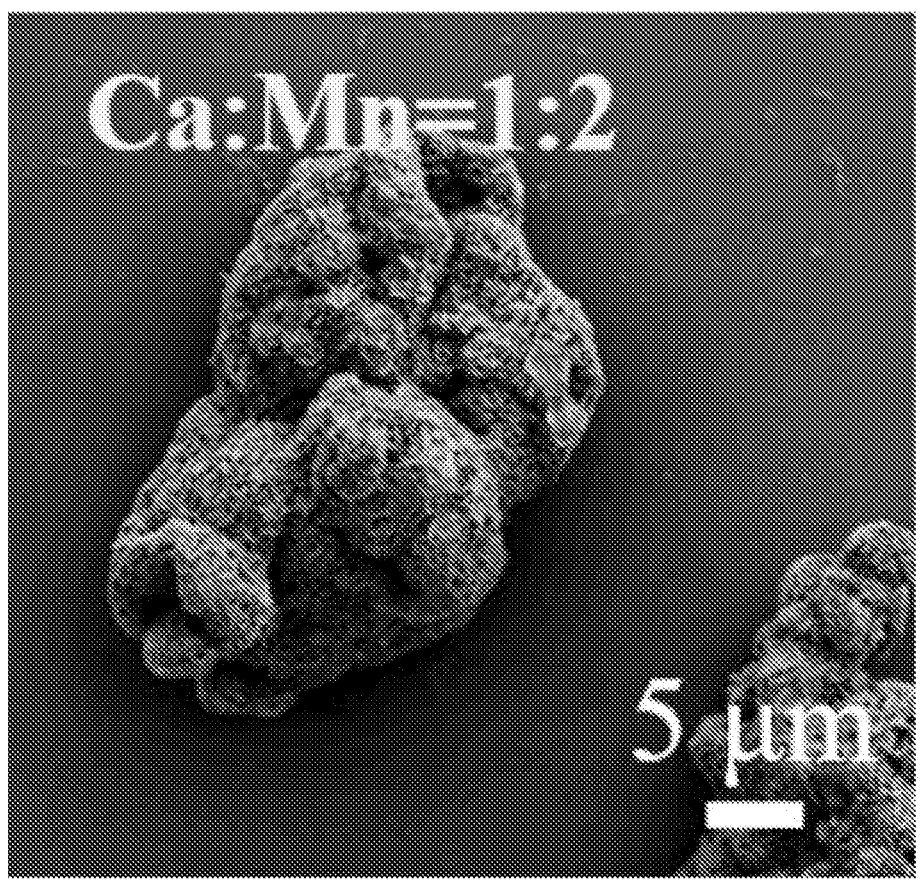
FIG. 17 is a SEM image of the porous manganese-containing Fenton catalytic material as prepared in Example 8.
Figure 18:
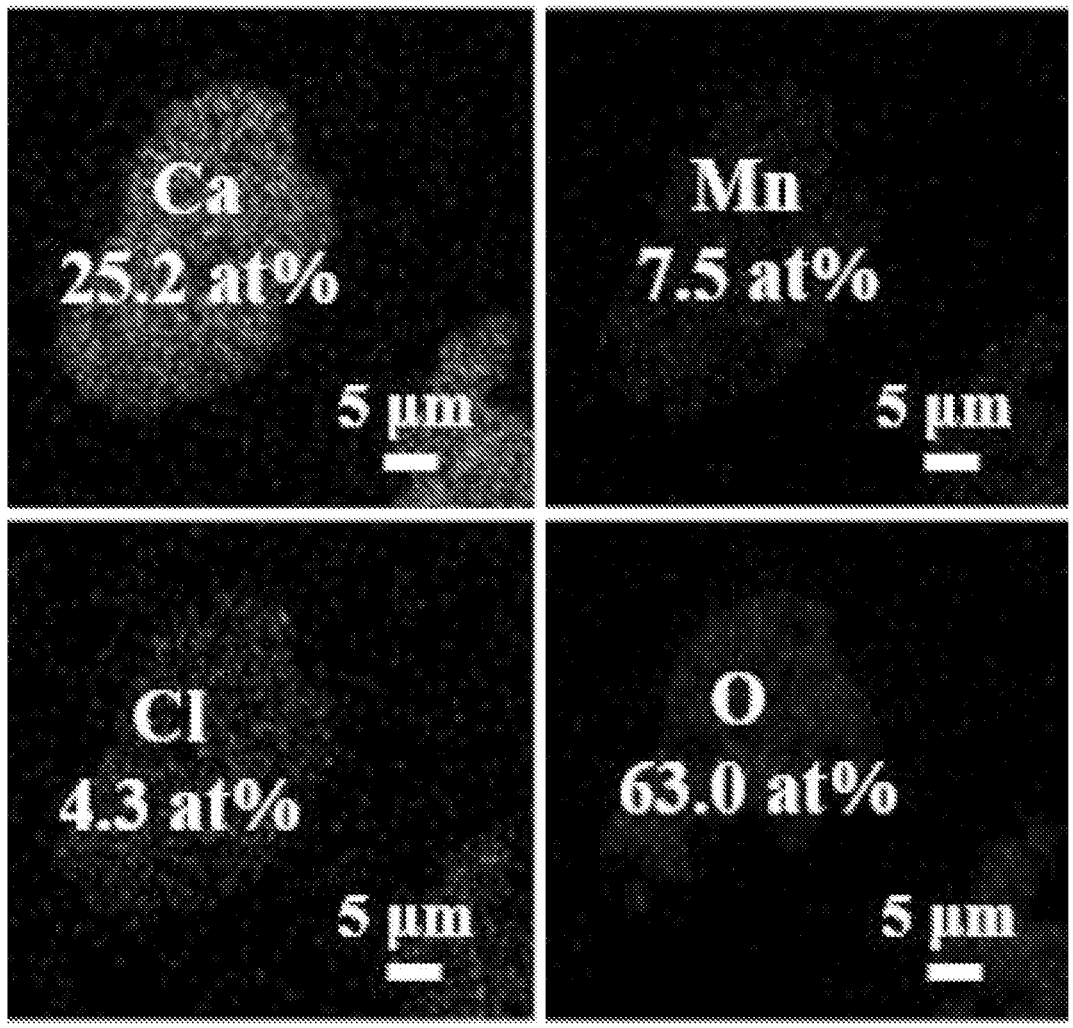
FIG. 18 shows an EDX graph of the porous manganese-containing Fenton catalytic material as prepared in Example 8.
Figure 19:
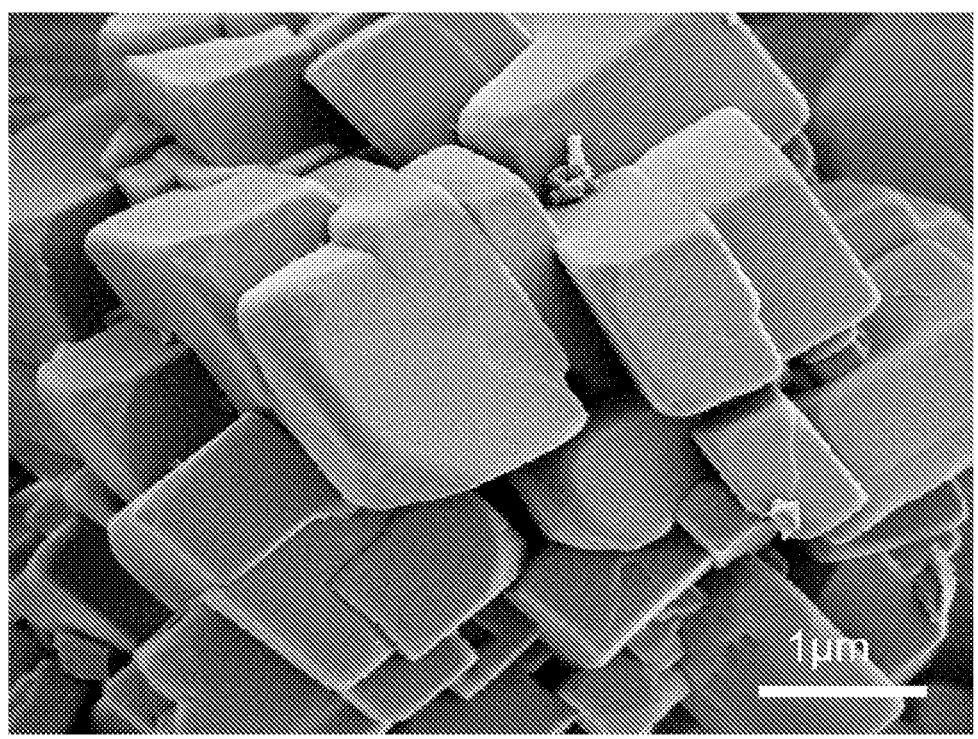
FIG. 19 is a SEM image of the manganese-containing Fenton catalytic material as prepared in Comparative Example 1.
Figure 20:
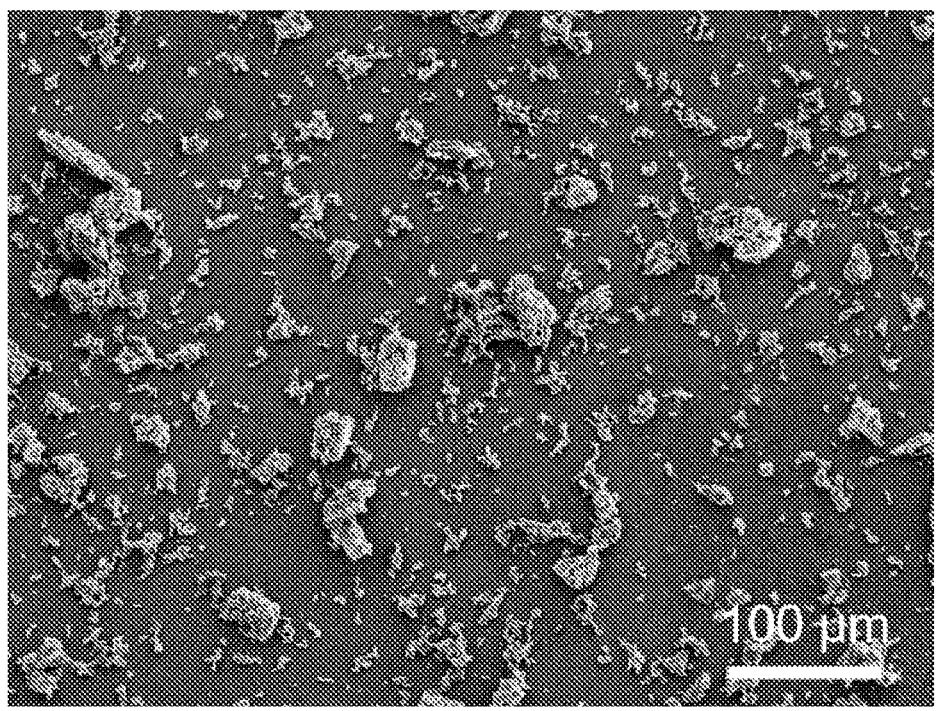
FIG. 20 is a SEM image of the porous manganese-containing Fenton catalytic material as prepared in Comparative Example 2.
Figure 21:
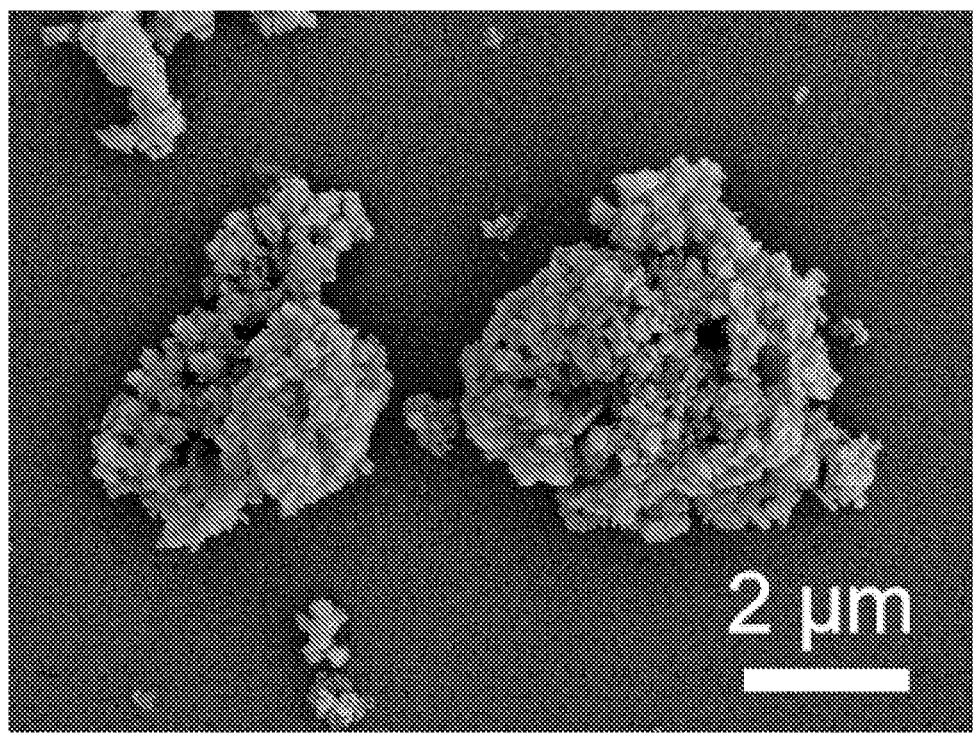
FIG. 21 is a SEM image of the porous manganese-containing Fenton catalytic material as prepared in Comparative Example 3.
Figure 22:
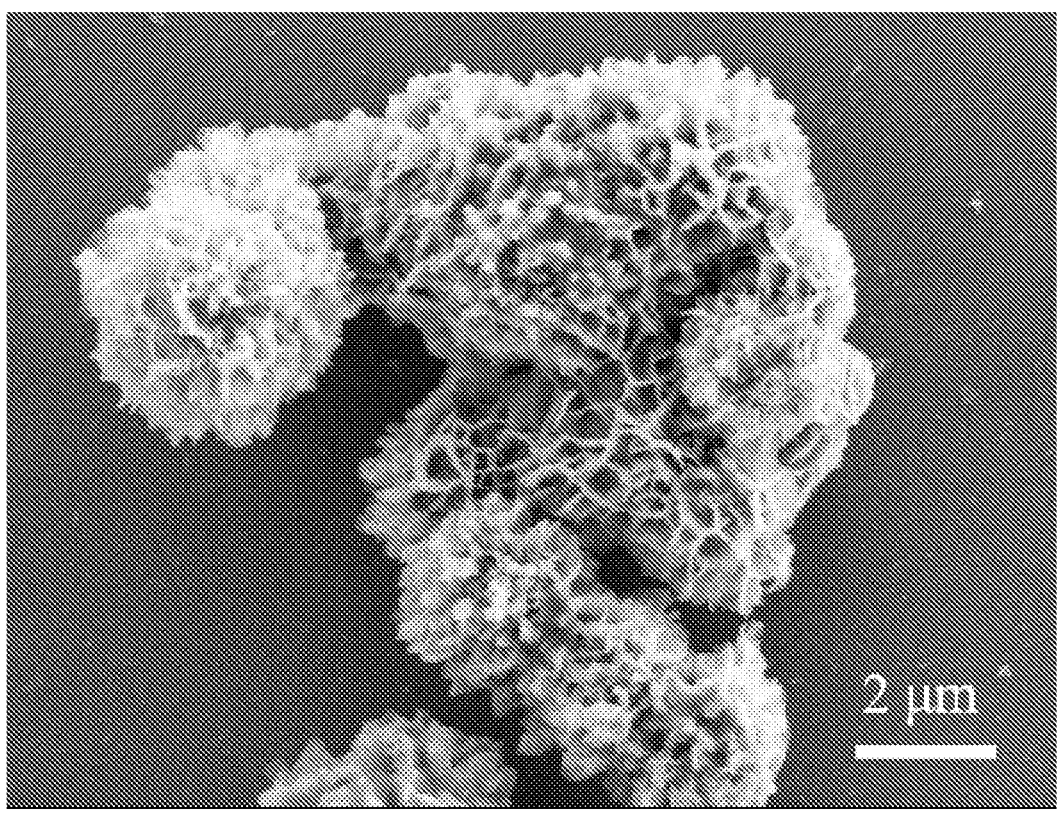
FIG. 22 is a SEM image of the porous manganese copper Fenton catalytic material as prepared in Comparative Example 4.

FIG. 1 shows an XRD pattern of the porous manganese-containing Fenton catalytic material as prepared in Example 1; FIG. 2 is a SEM image of the porous manganese-containing Fenton catalytic material as prepared in Example 1; FIG. 3 is an AFM image (left) of the porous manganese-Fenton catalytic material prepared in Example 1 and a schematic diagram of the corresponding nanosheet thickness (right); FIG. 4 is a TEM image of the porous manganese-containing Fenton catalytic material as prepared in Example 1; FIG. 5 shows an EDX graph of the porous manganese-containing Fenton catalytic material as prepared in Example 1; FIG. 6 is a SEM image of the porous manganese-containing Fenton catalytic material as prepared in Example 2; FIG. 7 is a SEM image of the porous manganese-containing Fenton catalytic material as prepared in Example 3; FIG. 8 is a diagram showing XRD patterns of the porous manganese-containing Fenton catalytic materials as prepared in Examples 4-6; FIG. 9 is a SEM image of the porous manganese-containing Fenton catalytic material as prepared in Example 4; FIG. 10 shows an EDX graph of the porous manganese-containing Fenton catalytic material as prepared in Example 4; FIG. 11 is a SEM image of the porous manganese-containing Fenton catalytic material as prepared in Example 5; FIG. 12 shows an EDX graph of the porous manganese-containing Fenton catalytic material as prepared in Example 5; FIG. 13 is a SEM image of the porous manganese-containing Fenton catalytic material as prepared in Example 6; FIG. 14 shows an EDX graph of the porous manganese-containing Fenton catalytic material as prepared in Example 6; FIG. 15 is a SEM image of the porous manganese-containing Fenton catalytic material as prepared in Example 7; FIG. 16 shows an EDX graph of the porous manganese-containing Fenton catalytic material as prepared in Example 7; FIG. 17 is a SEM image of the porous manganese-containing Fenton catalytic material as prepared in Example 8; FIG. 18 shows an EDX graph of the porous manganese-containing Fenton catalytic material as prepared in Example 8; FIG. 19 is a SEM image of the manganese-containing Fenton catalytic material as prepared in Comparative Example 1; FIG. 20 is a SEM image of the porous manganese-containing Fenton catalytic material as prepared in Comparative Example 2; FIG. 21 is a SEM image of the porous manganese-containing Fenton catalytic material as prepared in Comparative Example 3; FIG. 22 is a SEM image of the porous manganese copper Fenton catalytic material as prepared in Comparative Example 4.

As can be seen from FIG. 1, the main component of the porous manganese-containing Fenton catalytic material is CaO, but its diffraction peaks collectively shift to the small-angle area to a certain extent, indicating that the unit cell parameters and structure of the material have changed, and that calcium oxide undergoes a slight isomorphous substitution reaction or a small amount of Mn enters the interior of the calcium oxide lattice. As can be seen from FIG. 2 and FIG. 4, the porous manganese-containing Fenton catalytic material consists of particles with a cluster structure (flower-like particles) with a size of 5-10 μm, and each flower-like particle consists of many nanosheets. As can be seen from FIG. 3, the thickness of each nanosheet is 3-4 nm. As can be seen from FIG. 1, and FIGS. 4-6, when the time is 3 h, a small number of nanosheets have been formed on the surface of the CaO crystal particles; when the time is prolonged to 6 h, more obvious small nanosheets appear, and the nanosheets have begun to stack upon each other to form a certain pore structure, but the surface of large CaO particles could still be clearly observed in some areas. When the reaction time is 12 h and 24 h, the reaction is essentially completed, and CaO particles with a smooth surface could not be found in the SEM images, and relatively complete flower-like structures appear on the surface of CaO particles. As can be seen from comparisons among FIG. 2, FIG. 6, and FIG. 7, the porous manganese-containing Fenton catalytic material could be prepared by using different calcium sources, indicating that the marine biomass shell calcium source used in the present disclosure is universal. As can be seen from FIG. 2, FIG. 5, FIGS. 8-14, with the prolongation of reaction time, the sheet-like structure in the porous manganese-containing Fenton catalytic material gradually increases, and the proportion of Mn gradually increases, and the proportion of Ca gradually decreases. As can be seen from the EDX graphs in FIG. 10, FIG. 12, FIG. 14 and FIG. 5, with the prolongation of time, the atomic percentage of manganese in the porous manganese-containing Fenton catalytic material gradually increases to 1.9%, 4.7%, and 7.5% from 1.2%. As can be seen from FIG. 2, FIG. 5, and FIGS. 15-18, even adjusting the ratio of the porous-structure calcium oxide to manganese chloride, the proportions of Ca, Mn, Cl and O in the flower-like Mn—Ca nanomaterial substantially do not change. As can be seen from FIG. 2 and FIGS. 19-22, the growth limitation conditions of the special structure of flower-like Mn—Ca nanomaterials are as follows: (1) calcium oxide is an irreplaceable raw material for generating the flower-like Mn—Ca nanomaterial; (2) in this reaction system, $CO_2$ and $H_2O$ in the air must be excluded; (3) an anhydrous solvent must be used.

Figure 27:
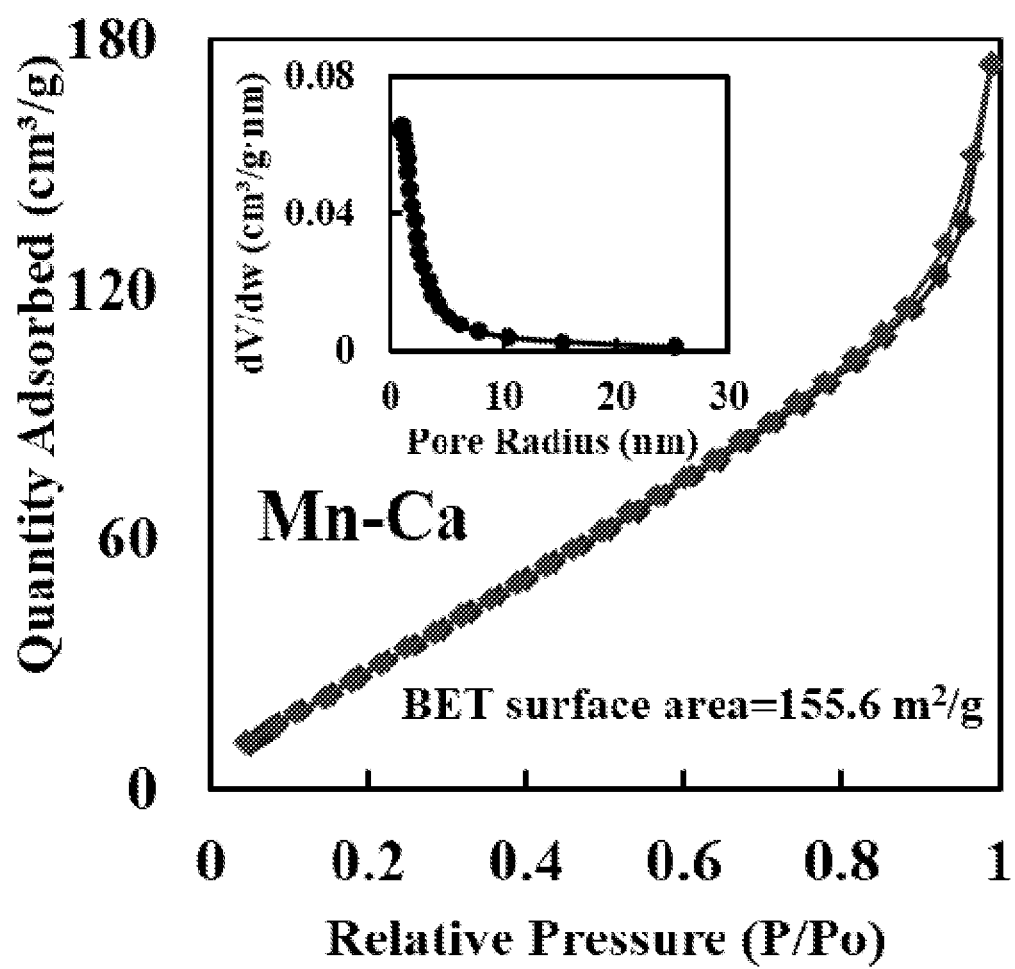
FIG. 27 shows $N_2$ adsorption-desorption curve (BET) of the porous manganese-containing Fenton catalytic material as prepared in Example 1.

FIG. 27 shows a $N_2$ adsorption-desorption curve (BET) of the porous manganese-containing Fenton catalytic material as prepared in Example 1. As can be seen from FIG. 27, the porous manganese-containing Fenton catalytic material has a larger specific surface area and a smaller pore size, indicating that the material has a porous-structure.

Use Example 1

Catalytic materials prepared in Examples 1-8 and Comparative Examples 1-4 were subjected to a removal experiment of acid blue and Cu(II).

Acid blue, a cupric chloride solution, and water were mixed, obtaining a mixed solution of acid blue and Cu(II), wherein the concentrations of acid blue and Cu(II) in the mixed solution were respectively 10 ppm, and the mixed solution has a pH value of 7. 10 mg of the catalytic materials prepared in Examples 1-8 and Comparative Examples 1-4 were respectively added into 50 mL of the mixed solution of acid blue and Cu(II). The resulting mixture was stirred vigorously at 500 rpm, and the UV absorption values of acid blue and Cu(II) in the mixed solution were measured after stirring for 0 s, 30 s and 60 s respectively by using a UV-Vis spectrophotometer. The removal rates of acid blue and Cu(II) were calculated. The measurement results are shown in FIGS. 23-25 and Table 1.

Figure 23:
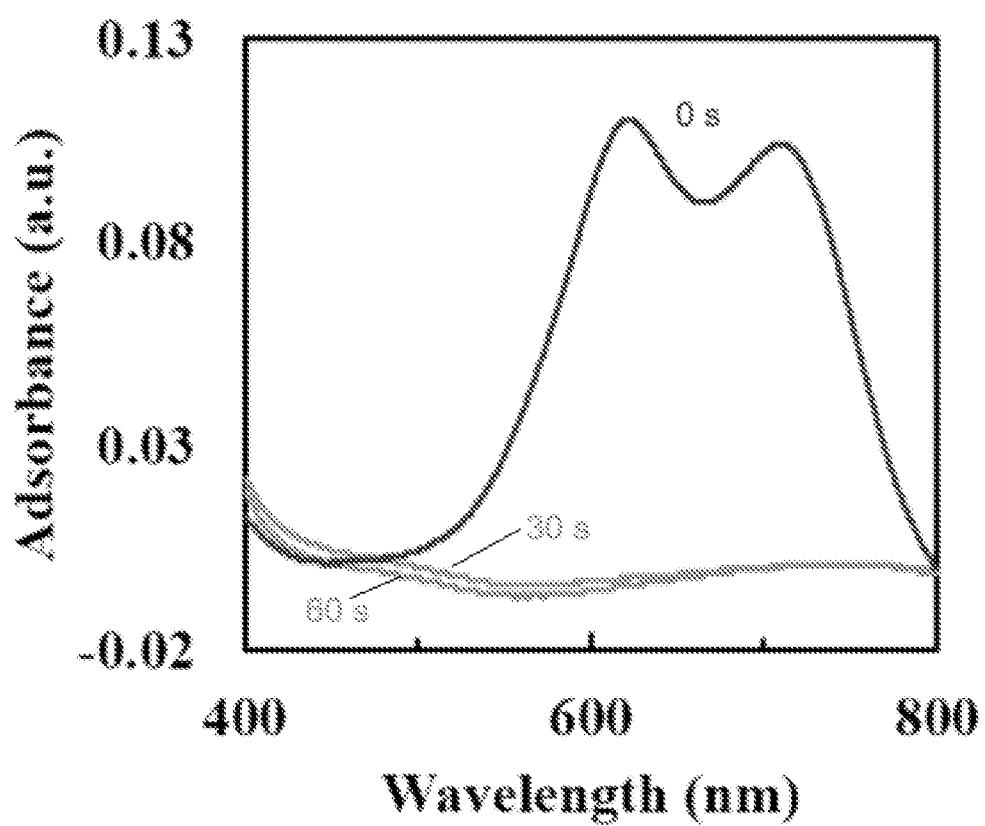
FIG. 23 shows the degradation of a mixed solution of acid blue and Cu(II) in the presence of the porous manganese-containing Fenton catalytic material prepared in Example 1.
Figure 24A:
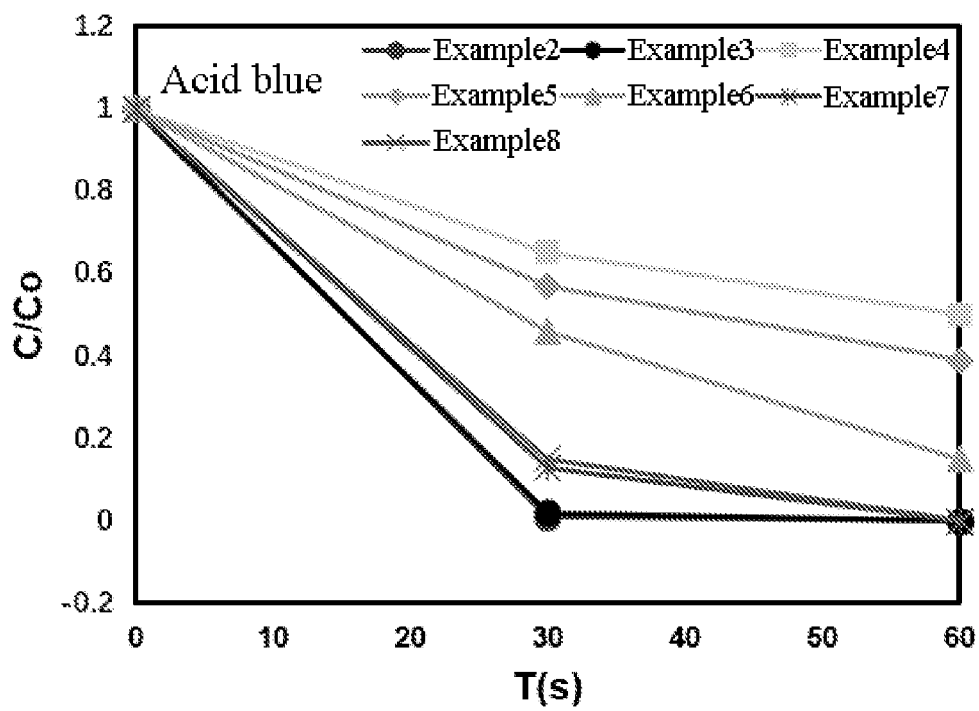
FIG. 24A shows the degradations of mixed solutions of acid blue in the presence of the porous manganese-containing Fenton catalytic materials as prepared in Examples 2-8, respectively.
Figure 24B:
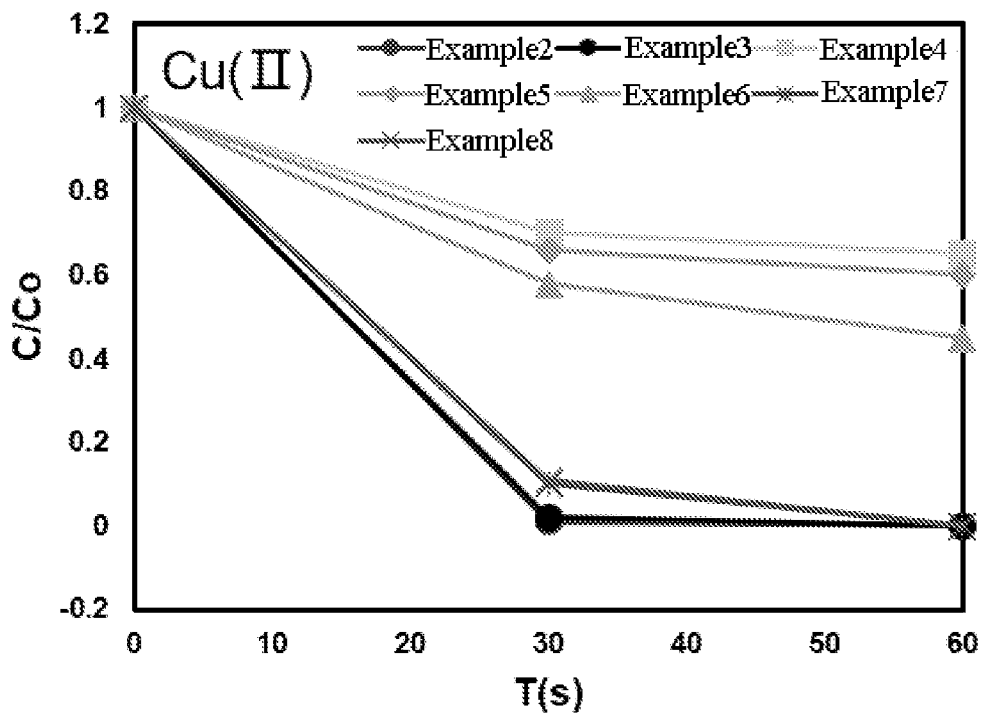
FIG. 24B shows the degradations of mixed solutions of Cu(II) in the presence of the porous manganese-containing Fenton catalytic materials as prepared in Examples 2-8, respectively.
Figure 25A:
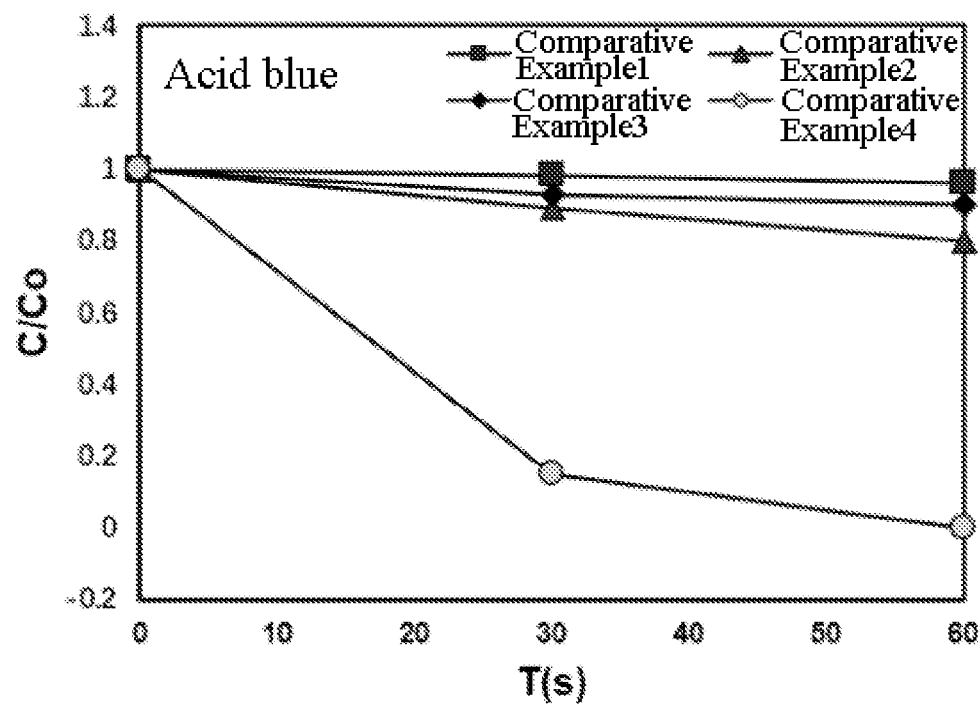
FIG. 25A shows the degradations of mixed solutions of acid blue in the presence of the porous manganese-containing Fenton catalytic materials as prepared in Comparative Examples 1-3 and Example 4, respectively.
Figure 25B:
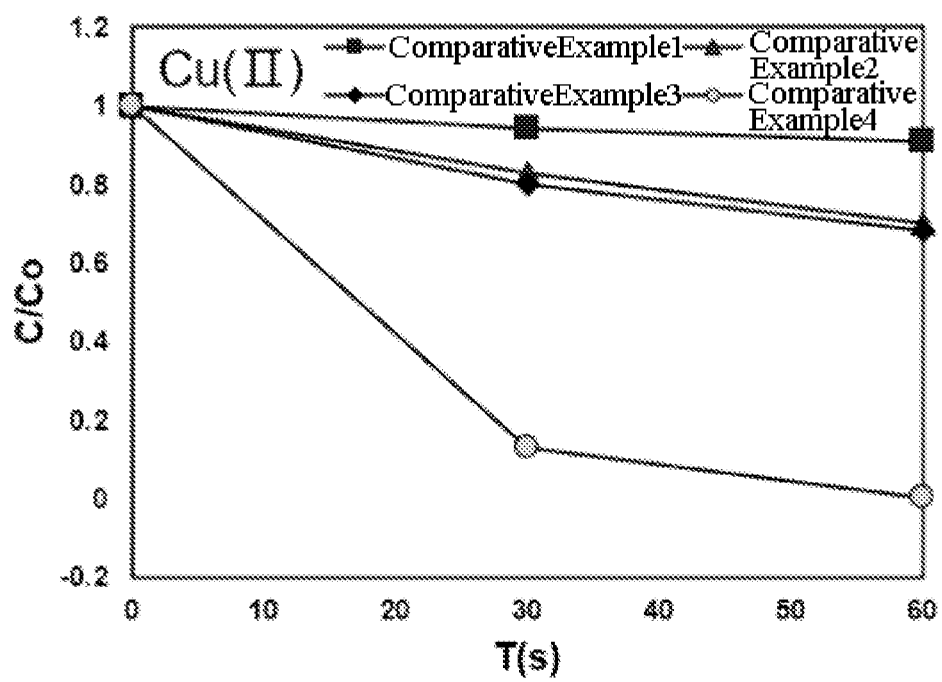
FIG. 25B shows the degradations of mixed solutions of Cu(II) in the presence of the porous manganese-containing Fenton catalytic materials as prepared in Comparative Examples 1-3 and Example 4, respectively.

FIG. 23 shows the degradation of a mixed solution of acid blue and Cu(II) in the presence of the porous manganese-containing Fenton catalytic material prepared in Example 1; FIG. 24A shows the degradations of mixed solutions of acid blue in the presence of the porous manganese-containing Fenton catalytic materials as prepared in Examples 2-8, respectively; FIG. 24B shows the degradations of mixed solutions of Cu(II) in the presence of the porous manganese-containing Fenton catalytic materials as prepared in Examples 2-8, respectively; FIG. 25A shows the degradations of mixed solutions of acid blue respectively in the presence of the porous manganese-containing Fenton catalytic materials as prepared in Comparative Examples 1-3 and Example 4; FIG. 25B shows the degradations of mixed solutions of Cu(II) respectively in the presence of the porous manganese-containing Fenton catalytic materials as prepared in Comparative Examples 1-3 and Example 4.

Use Example 2

Figure 26A:
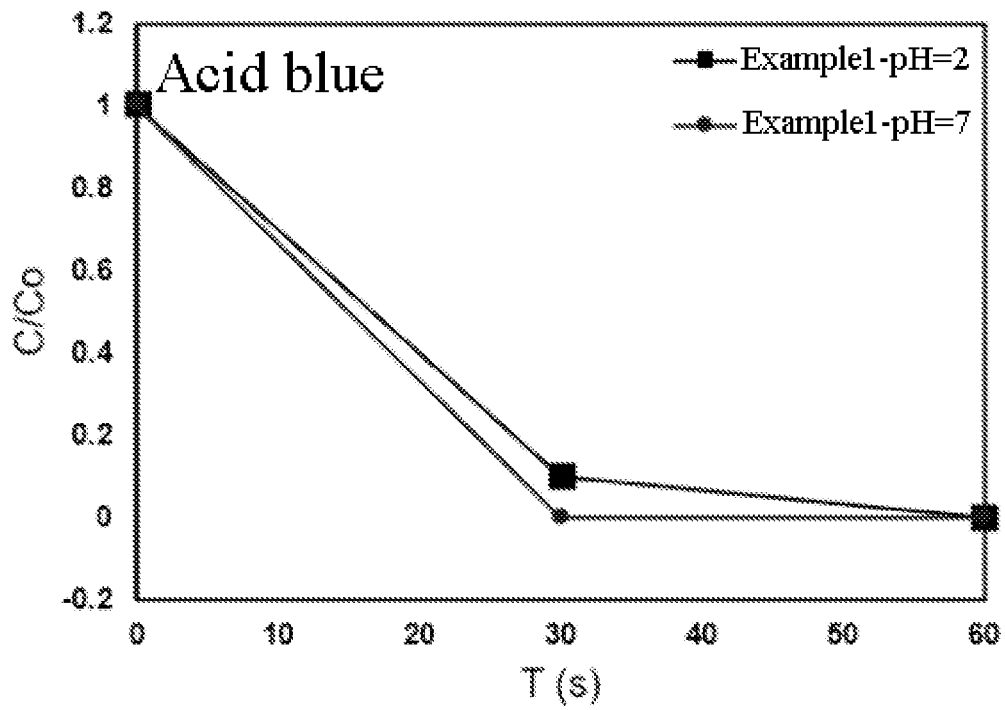
FIG. 26A shows degradation of a mixed solution of acid blue in the presence of the porous manganese-containing Fenton catalytic material as prepared in Example 1 under the condition of different pH values.
Figure 26B:
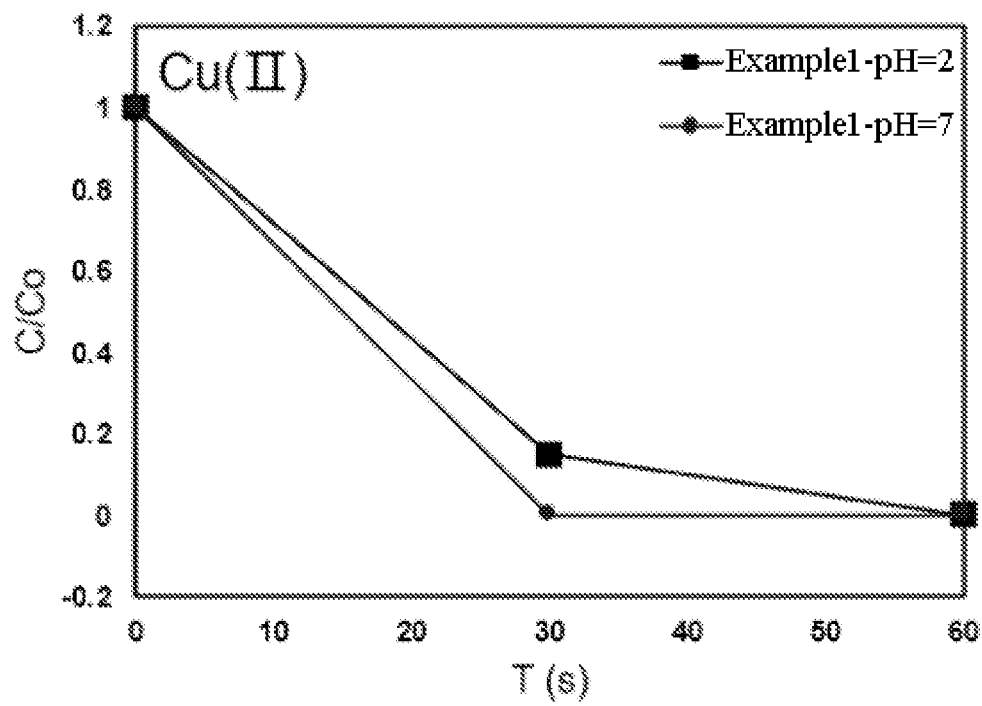
FIG. 26B shows degradation of a mixed solution of Cu(II) in the presence of the porous manganese-containing Fenton catalytic material as prepared in Example 1 under the condition of different pH values.

The porous manganese-containing Fenton catalytic material was subjected to a performance test according to the method as described in Use Example 1, expect that the acidity of the mixed solution was adjusted to pH=2 with hydrochloric acid; 50 mg of the catalytic material as prepared in Example 1 was added. The test results are shown in FIG. 26.

TABLE 1

Results of the mixed solution of acid blue and Cu(II) treated by catalytic materials for different treatment time

| Material | Degradation rate of acid blue/% | | | Adsorption removal rate of Cu(II)/% | | |
|---|---|---|---|---|---|---|
| | 0 s | 30 s | 60 s | 0 s | 30 s | 60 s |
| Example 1 | 0 | 100 | 100 | 0 | 100 | 100 |
| Example 2 | 0 | 99 | 100 | 0 | 99 | 100 |
| Example 3 | 0 | 98 | 100 | 0 | 98 | 100 |
| Example 4 | 0 | 35 | 50 | 0 | 30 | 35 |
| Example 5 | 0 | 43 | 61 | 0 | 34 | 40 |
| Example 6 | 0 | 54 | 85 | 0 | 42 | 55 |
| Example 7 | 0 | 87 | 100 | 0 | 90 | 100 |
| Example 8 | 0 | 85 | 100 | 0 | 89 | 100 |
| Comparative Example 1 | 0 | 2 | 4 | 0 | 6 | 9 |
| Comparative Example 2 | 0 | 11 | 20 | 0 | 17 | 30 |
| Comparative Example 3 | 0 | 7 | 10 | 0 | 20 | 32 |
| Comparative Example 4 | 0 | 85 | 100 | 0 | 87 | 100 |

As can be seen from Table 1 and FIGS. 23-26, the porous manganese-containing Fenton catalytic material prepared in the present disclosure enables that acid blue could be degraded and divalent copper ions could be adsorbed within 30 s under a neutral condition, without adding $H_2O_2$, thereby playing dual role of degrading organic matter(s) and adsorbing heavy metal(s).

The above are only the preferred embodiments of the present disclosure. It should be pointed out that for those skilled in the art, without departing from the principles of the present disclosure, several improvements and modifications could be made. These improvements and modifications shall be deemed to fall within the scope of the present disclosure.

What is claimed is:

1. A method for preparing a porous manganese-containing Fenton catalytic material, comprising steps of
calcining a marine biomass shell material, to obtain a porous-structure calcium oxide;
in a protective atmosphere, mixing the porous-structure calcium oxide with an anhydrous alcohol solvent, to obtain a calcium oxide dispersion; and
in a protective atmosphere, mixing the calcium oxide dispersion with a solution of $MnCl_2$ to obtain a mixture, and subjecting the mixture to a self-assembly reaction, to obtain the porous manganese-containing Fenton catalytic material;
wherein the porous manganese-containing Fenton catalytic material comprises particles with a cluster structure, wherein
the particles with the cluster structure comprise a porous-structure calcium oxide and two-dimensional nanosheets of a Mn—Ca compound on a surface of the porous-structure calcium oxide.

2. The method as claimed in claim 1, wherein the marine biomass shell material comprises at least one selected from the group consisting of an oyster shell, a paphia undulata shell, and a scallop shell.

3. The method as claimed in claim 1, wherein calcining the marine biomass shell material is performed at a temperature of 900-1200° C. for 1-5 h.

4. The method as claimed in claim 1, wherein a mass ratio of the porous-structure calcium oxide to the solution of $MnCl_2$ is in the range of 1:0.3 to 1:30.

5. The method as claimed in claim 1, wherein the self-assembly reaction is performed with a stirring, and the stirring is performed at a speed of 500-1,000 rpm for 3-48 h.

6. The method as claimed in claim 1, wherein the particles with the cluster structure have a particle size of 5-10 μm.

7. The method as claimed in claim 1, wherein the two-dimensional nanosheets have a thickness of 3-4 nm.

8. The method as claimed in claim 1, wherein an atomic percentage of Mn in the Mn—Ca compound is in the range of 1-10%.

9. The method as claimed in claim 5, wherein a mass ratio of the porous-structure calcium oxide to the solution of $MnCl_2$ is in the range of 1:0.3 to 1:30.

* * * * *